US012588672B2

(12) United States Patent
Tadiello et al.

(10) Patent No.: US 12,588,672 B2
(45) Date of Patent: Mar. 31, 2026

(54) REPELLENCE SYSTEM AND REPELLENCE METHOD FOR REPELLING ANIMALS

(71) Applicant: FLOX AB, Sundbyberg (SE)

(72) Inventors: Matteo Tadiello, Sundbyberg (SE); Marco Moletta, Sundbyberg (SE)

(73) Assignee: FLOX AB, Stockholm (SE)

( * ) Notice: Subject to any disclaimer, the term of this patent is extended or adjusted under 35 U.S.C. 154(b) by 0 days.

(21) Appl. No.: 18/698,913

(22) PCT Filed: Oct. 7, 2022

(86) PCT No.: PCT/SE2022/050903
§ 371 (c)(1),
(2) Date: Apr. 5, 2024

(87) PCT Pub. No.: WO2023/059258
PCT Pub. Date: Apr. 13, 2023

(65) Prior Publication Data
US 2025/0221397 A1      Jul. 10, 2025

(30) Foreign Application Priority Data
Oct. 8, 2021      (SE) ..................................... 2151236-3

(51) Int. Cl.
*A01M 29/10*          (2011.01)
*A01M 29/18*          (2011.01)
(Continued)

(52) U.S. Cl.
CPC ............ *A01M 29/10* (2013.01); *A01M 29/18* (2013.01); *G05D 1/485* (2024.01); *G05D 1/686* (2024.01);
(Continued)

(58) Field of Classification Search
None
See application file for complete search history.

(56) References Cited

U.S. PATENT DOCUMENTS 7,113,098 B1 *   9/2006   Hayes ................... A01M 29/18
                                                                  340/573.2
2017/0091920 A1       3/2017   Suga Ya
                                          (Continued)

FOREIGN PATENT DOCUMENTS

AU          2021101929 A4      6/2021
CN          109977753 A        7/2019
                          (Continued)

OTHER PUBLICATIONS

International Search Report issued by the Patent-och registreringsverket acting as the International Searching Authority in relation to International Application No. PCT/SE2022/050903 dated Dec. 27, 2022 (5 pages).

(Continued)

*Primary Examiner* — Thomas S McCormack
(74) *Attorney, Agent, or Firm* — Carter, DeLuca & Farrell LLP

(57)          ABSTRACT

A repellence system and method for repelling animals includes an imaging device arranged to generate image data from a railway track, one or more deterrence devices arranged to carry out deterrence actions for repelling animals and a repellence sub-system having one or more processors and memory storing instructions for execution by the one or more processors. The repellence sub-system being configured to receive image data of the railway track from the imaging device, detect an animal in the image data, identify animal species of the detected animal in the image data, provide species specific deterrence instructions to the one or more deterrence devices based on the identified animal species.

14 Claims, 14 Drawing Sheets

(51) Int. Cl.

| | | |
|---|---|---|
| *G05D 1/485* | (2024.01) | |
| *G05D 1/686* | (2024.01) | |
| *G05D 105/50* | (2024.01) | |
| *G05D 105/85* | (2024.01) | |
| *G05D 109/20* | (2024.01) | |
| *G05D 111/10* | (2024.01) | |
| *G06T 7/20* | (2017.01) | |
| *G06V 10/764* | (2022.01) | |
| *G06V 20/17* | (2022.01) | |
| *G06V 20/58* | (2022.01) | |
| *G06V 40/10* | (2022.01) | |

(52) U.S. Cl.

CPC .............. *G06T 7/20* (2013.01); *G06V 10/764* (2022.01); *G06V 20/17* (2022.01); *G06V 20/58* (2022.01); *G06V 40/10* (2022.01); *G05D 2105/50* (2024.01); *G05D 2105/85* (2024.01); *G05D 2109/20* (2024.01); *G05D 2111/10* (2024.01); *G06V 2201/07* (2022.01)

(56) References Cited

U.S. PATENT DOCUMENTS

| | | | | |
|---|---|---|---|---|
| 2017/0280701 | A1* | 10/2017 | Teh ....................... | A01M 29/18 |
| 2019/0069535 | A1 | 3/2019 | Hauck, Jr. | |
| 2020/0126248 | A1 | 4/2020 | Nitzan et al. | |
| 2020/0257896 | A1 | 8/2020 | Paszek et al. | |
| 2021/0005086 | A1 | 1/2021 | Cohen | |
| 2021/0084888 | A1 | 3/2021 | Lazar et al. | |
| 2021/0259235 | A1* | 8/2021 | Candelore .............. | G06V 40/10 |
| 2022/0295025 | A1* | 9/2022 | Seidel ...................... | H04R 1/32 |

FOREIGN PATENT DOCUMENTS

| | | | |
|---|---|---|---|
| CN | 112155004 | A | 1/2021 |
| CN | 113283311 | A | 8/2021 |
| JP | 2013158334 | A | 8/2013 |
| JP | 2018196360 | A | 12/2018 |
| JP | 6858076 | B2 | 4/2021 |
| KR | 20170054808 | A | 5/2017 |

OTHER PUBLICATIONS

Written Opinion of the International Searching Authority issued by the Patent-och registreringsverket acting as the International Searching Authority in relation to International Application No. PCT/SE2022/050903 dated Dec. 27, 2022 (9 pages).

Swedish Search Report issued by the Swedish Patent and Registration Office in relation to Swedish Application No. 2151236-3 dated May 9, 2022 (3 pages).

* cited by examiner

40

21

24

22

26, 28

40

26, 28

21

26, 28

24

22

200

Scanning an area with an imaging device and producing image data    202

Providing the image data as input to a detection system    204

Detecting animal(s) in the image data by utlizing the detection system    206

<u>200</u>

<u>300</u>

302

Providing the image as input data
to the identification system

304

Identifying species of the animal(s) in the
image data by utilizing the detection system <u>300</u>

302

Providing the image as input data
to an identification nalgorithm

304

Identifying species of the animal(s)
in the image data by utilizing
the identification algorithm <u>400</u>

Activating a deterrance device based on identification fo the animal(s)    ~402

REPELLENCE SYSTEM AND REPELLENCE METHOD FOR REPELLING ANIMALS

CROSS-REFERENCE TO RELATED APPLICATIONS

This application is a national phase entry under 35 U.S.C. 371 of PCT International Application No. PCT/SE2022/050903 filed Oct. 7, 2022, which claims priority to Swedish Patent Application No. 2151236-3, filed Oct. 8, 2021, the disclosure of each of these applications is expressly incorporated herein by reference in their entirety.

FIELD OF THE INVENTION

The present invention relates to a repellence system for repelling animals. The present invention further relates to repellence method for repelling animals.

BACKGROUND OF THE INVENTION

Wild animals can cause dangerous situations in railway tracks and further accidents which may further cause even loss of human and animal lives. To avoid accidents in railway tracks different kinds of fences have been used to prevent animals from entering and crossing railway tracks. However, the fences are laborious to install and require continuous maintenance work. Furthermore, the fences prevent natural movement of wild animals.

BRIEF DESCRIPTION OF THE INVENTION

An object of the present invention is to provide a repellence system and repellence method such that the prior art disadvantages are solved or at least alleviated.

The preferred embodiments of the invention are disclosed in the dependent claims.

The invention is based on the idea of providing a repellence system for repelling animals from a railway track. The repellence system comprises an imaging device arranged to generate image data from the railway track, the imaging device being arranged to a train and directed in forward moving direction of the train along the railway track, and one or more deterrence devices arranged to carry out deterrence actions for repelling animals from the railway track. The repellence system further comprises a repellence sub-system having one or more processors and memory storing instructions for execution by the one or more processors. The repellence sub-system being configured to receive image data of the railway track from the imaging device during movement of the train in the forward moving direction along the railway track, detect an animal in the image data with the repellence sub-system, identify animal species of the detected animal in the image data with the repellence sub-system, provide species specific deterrence instructions automatically to the one or more deterrence devices based on the identified animal species for carrying out species specific deterrence actions with the one or more deterrence devices, the species specific deterrence instructions being specific to the identified animal species, and initiate the species specific deterrence actions automatically with the one or more deterrence devices and direct the deterrence actions towards the detected and identified animal and towards the railway track for repelling the animal from the railway track.

Accordingly, the repellence system of the present invention enables producing deterrence actions specific to the animal species identified in the railway track and directing the deterrence actions towards the animal and the railway trac. Thus, the repellence of the animals is highly effective and is carried out only when needed and the animal is on the way of the train. Further, the imaging device is provided to the train such that no imaging devices need to be installed fixedly along the railway track.

In the context of this application the term animal species means especially different animal families, for example, but not limited to, pigs, deers, bears, or birds. In some embodiments of the present invention the term animal species means different species within one animal family, such as different kinds of birds.

In one embodiment, the imaging device is a thermographic imaging device configured to generate thermographic image data. The thermographic imaging device enables detecting and identifying animals also during night.

In another embodiment, the imaging device is an infrared imaging device configured to generate infrared image data. Also, the infrared imaging device enables detecting and identifying animals also during night.

In a further embodiment, the imaging device is a digital colour imaging device configured to generate colour image data. The digital colour imaging device enables utilizing colours in the image data for identifying the animal species.

In yet another embodiment, the imaging device is a Lidar camera having a lidar sensor and configured to generate range image data. Lidar is an acronym of "light detection and ranging" or "laser imaging, detection, and ranging". Lidar cameras may also be used measuring distance to the detected animal.

In yet another embodiment, the imaging device is an RGB-D camera configured to generate range image data. RGD-D is an acronym of "Red Green Blue-Depth". RGB-D camera provides depth information associated with corresponding RGB data. RGB-D camera is configured to produce a 2D image showing the distance to points in a scene from a specific point, normally associated with some type of sensor device. The resulting image, the range image, has pixel values that correspond to the distance.

Further in the context of this application, the repellence system comprises one or more imaging devices. In some embodiments, all the imaging devices are similar-type imaging devices, such as thermographic imaging devices, or infrared imaging devices or digital colour imaging devices. In some other embodiments, the repellence system may comprise two or more different type of imaging devices, such as any combination of thermographic, infrared and digital colour imaging devices, Lidar cameras and RGB-D cameras.

In one embodiment, the repellence sub-system is configured to receive video image data from the imaging device.

In another embodiment, the repellence sub-system is configured to receive thermographic video image data from the thermographic imaging device.

In another embodiment, the repellence sub-system is configured to receive infrared video image data from the infrared imaging device.

In another embodiment, the repellence sub-system is configured to receive colour video image data from the colour imaging device.

Providing the image data in video format and receiving the video image data in the repellence sub-system enables analysing the image in greater detail and frequency.

In one embodiment, the repellence sub-system is configured to automatically detect the animal in the image data with a computer vision algorithm, the computer vision algorithm being trained to detect animal in the image data.

In another embodiment, the repellence sub-system is configured to input the image data as first input image data to a computer vision algorithm, and automatically detect the animal in the first input image data with the computer vision algorithm, the computer vision algorithm being trained to detect animal in the first input image data.

In a further embodiment, the repellence sub-system is configured to input the video image data as first input image data to a computer vision algorithm, and automatically detect the animal in the first input image data with the computer vision algorithm by processing each frame of the video image data with the computer vision algorithm to detect the animal, the computer vision algorithm being trained to detect animal in the first input image data.

The computer vision algorithm may be any known algorithm capable of and trained to detect animal(s) in image data. This enables efficient and quick detection of animal(s) in the surveillance area.

Accordingly, the repellence system and/or the computer vision algorithm may be configured to detect one or more animals in the first input data.

In any one of the embodiments of the present invention, the repellence system and/or the computer vision algorithm may be configured to automatically detect and identify number of animals in the first input image data.

In one embodiment, the repellence sub-system is configured to automatically identify the animal species of the detected animal in the image data with an image identification algorithm, the image identification algorithm being trained to identify different animal species from the image data.

In another embodiment, the repellence sub-system is configured to input the image data as second input image data to an image identification algorithm, and automatically identify animal species of the detected animal in the second input image data with the image identification algorithm, the image identification algorithm being trained to identify different animal species from the second input image data.

In a further embodiment, the repellence sub-system is configured to input the video image data as second input image data to an image identification algorithm, and automatically identify animal species of the animal in the second input image data with the image identification algorithm by processing one or more frames of the video image data with the image identification algorithm to identify animal species of the animal, the image identification algorithm being trained to identify different animal species from the second input image data.

Utilizing the image identification algorithm configured to and trained to identify animal species of the detected animal enables selecting most efficient deterrence actions for repelling the detected animals in automatic or autonomous manner in a quick manner.

Utilizing separate computer vision algorithm for detecting animals and image identification algorithm for identifying animal species provides efficient processing as the image identification algorithm may be utilized only when an animal or potential animal is detected in the image data with the computer vision algorithm.

In an alternative embodiment, the repellence sub-system is configured to automatically identify the animal species of the detected animal in the image data with the computer vision algorithm, the computer vision algorithm being trained to identify different animal species from the image data.

In another embodiment, the repellence sub-system is configured to input the image data as the first input image data to the computer vision algorithm, and automatically identify animal species of the detected animal in the first input image data with the computer vision algorithm, the computer vision algorithm being trained to identify different animal species from the first input image data.

In a further embodiment, the repellence sub-system is configured to input the video image data as the first input image data to the computer vision algorithm, and automatically identify animal species of the animal in the first input image data with the computer vision algorithm by processing one or more frames of the video image data with the computer vision algorithm to identify animal species of the animal, the computer vision algorithm being trained to identify different animal species from the first input image data.

Utilizing the computer vision algorithm for both detecting animals and identifying animal species of the detected animals make the system fast and efficient in providing detection and identification of animals. Thus, the computer vision algorithm is configured to and trained to detect and identify animal species. Thus, in these embodiments there is only one algorithm for both detecting animals and identifying animal species.

In some embodiments, the repellence sub-system comprises an identification database having two or more animal species profiles stored in the identification database, each of the animal species profiles being specific to one animal species.

In one embodiment, the repellence sub-system is configured to define an animal species profile corresponding the identified animal species of the detected animal based on the identification.

In another embodiment, the repellence sub-system is configured to utilize a classification algorithm as the image identification algorithm, and classify the detected animal to an animal species, and define an animal species profile corresponding the identified animal species of the detected animal to an animal species profile based on the classification.

In a further embodiment, the repellence sub-system is configured to utilize a classification algorithm as the compute vision algorithm, and classify the detected animal to an animal species, and define an animal species profile corresponding the identified animal species of the detected animal to an animal species profile based on the classification.

Accordingly, the detected animal may be associated to the animal species profile corresponding the identified animal species of the detected animal. The animal species profile may further comprise species specific deterrence instructions.

The detection and/or identification algorithms may be based on neural networks. Examples of specific algorithms comprise Faster R-CNN (Region Based Convolutional Neural Network), YOLO (You Only Look Once), SSD (Single Shot MultiBox Detector) and R-FCN (Region-based Fully Convolutional Networks).

In one embodiment, the one or more deterrence devices comprise a deterrence sound device arranged to generate species specific deterrence sound action as the deterrence action in response to the species specific deterrence instructions. The detected and identified animal may be repelled by emitting species specific deterrence sounds from the deterrence sound device.

In an alternative embodiment, the one or more deterrence devices comprise a deterrence ultrasound device arranged to generate species specific deterrence ultrasound action as the deterrence action in response to the species specific deterrence instructions. The detected and identified animal may be repelled by emitting species specific deterrence ultrasound from the deterrence ultrasound device.

Ultrasound is sound waves with frequencies higher than the upper audible limit of human hearing. In the present application ultrasound means sound frequencies from 20 kHz up, for example to 100-300 kHz. The frequency of the ultrasound may vary based on the identified animal species. Accordingly, the deterrence ultrasound device is arranged to generate species specific deterrence ultrasound having predetermined frequency based on the identified animal species.

In a further embodiment, the one or more deterrence devices comprise a deterrence light device arranged to generate species specific deterrence light action as the deterrence action in response to the species specific deterrence instructions. The detected and identified animal may be repelled by emitting species specific deterrence light from the deterrence light device.

In yet another embodiment, the one or more deterrence devices comprise a deterrence sound device arranged to generate species specific deterrence sound action and a deterrence light device arranged to generate species specific deterrence light action as the deterrence actions in response to the species specific deterrence instructions. The detected and identified animal may be repelled by emitting species specific deterrence sounds and light from the deterrence sound and light devices.

In a yet further embodiment, a deterrence ultrasound device arranged to generate species specific deterrence ultrasound action and a deterrence light device arranged to generate species specific deterrence light action as the deterrence actions in response to the species specific deterrence instructions. The detected and identified animal may be repelled by emitting species specific deterrence ultrasounds and light from the deterrence ultrasound and light device.

In one embodiment, the repellence sub-system is configured to generate species specific deterrence instructions based on the identification of the animal species of the detected animal, and provide the generated species specific deterrence instructions to the one or more deterrence devices.

In another embodiment, each of the two or more animal species profiles comprise species specific deterrence instructions specific to the respective animal species, the species specific deterrence instructions comprising instructions to carry out species specific deterrence actions with the one or more deterrence devices specific to the animal species.

The repellence sub-system is configured to carry out the species specific deterrence actions based on the species specific deterrence instructions of the animal species profile corresponding the identified animal species of the detected animal.

Alternatively, the repellence sub-system is configured to provide the species specific deterrence instructions of the animal species profile corresponding the identified animal species of the detected animal to the one or more deterrence devices, and operate the one or more deterrence devices based on the species specific deterrence instructions corresponding the animal species profile of the identified animal species o the detected animal to generate species specific deterrence actions with the one or more deterrence devices.

In some embodiments the identification database comprises at least deers profile, boars/wild pigs profile, humans profile and birds profile. Each of the profiles is provided with species specific deterrence instructions.

The deers profile comprises deers deterrence instructions. The hearing range of deers is from 32 Hz to 64 kHz. The deers deterrence instructions comprise instructions to utilize and adjust the sound and/or ultrasound deterrence device to utilize deterrence sound in the hearing range of the deers between the 32 Hz and 64 kHz. In a preferred embodiment, the deers deterrence instructions comprise instructions to utilize and adjust the ultrasound deterrence device to utilize deterrence ultrasound in the range between the 20 Hz and 64 kHz. This deterrence ultrasound cannot be heard by humans.

The boars or wild pigs profile comprises boars or wild pigs deterrence instructions. The hearing range of boars or wild pigs is from 42 Hz to 40.5 kHz. The boars or wild pigs deterrence instructions comprise instructions to utilize and adjust the sound and/or ultrasound deterrence device to utilize deterrence sound in the hearing range of the boars or wild pigs between the 42 Hz and 40.5 kHz. In a preferred embodiment, the boars or wild pigs deterrence instructions comprise instructions to utilize and adjust the ultrasound deterrence device to utilize deterrence ultrasound in the range between the 20 Hz and 40.5 kHz. This deterrence ultrasound cannot be heard by humans.

The humans profile comprises human deterrence instructions. The hearing range of humans is from 20 Hz to 20 kHz. The human deterrence instructions comprise instructions to utilize and adjust the sound and/or ultrasound deterrence device to utilize deterrence sound in the hearing range of the humans between the 20 Hz and 20 kHz.

The birds profile comprises birds deterrence instructions. The hearing range of birds is from 1 kHz to 4 kHz. The birds deterrence instructions comprise instructions to utilize and adjust the sound deterrence device to utilize deterrence sound in the hearing range of the birds between the 1 kHz and 4 kHz. Accordingly, the one or more deterrence devices are operated based on the species specific deterrence instructions such that the most efficient deterrence actions are used for different animal species.

In one embodiment, the one or more deterrence devices comprise the deterrence ultrasound device. The repellence sub-system is configured to carry out the species specific deterrence actions by utilizing a species specific ultrasound frequency value in the deterrence ultrasound device based on the identified animal species of the detected animal, the species specific deterrence instructions comprising the species specific ultrasound value.

In another embodiment, the one or more deterrence devices comprise the deterrence ultrasound device. The repellence sub-system is configured to generate species specific deterrence instructions comprising a species specific ultrasound frequency value for the deterrence ultrasound device based on the identified animal species of the detected animal, provide the generated species specific deterrence instructions to the deterrence ultrasound device, and operate the deterrence ultrasound device with the species specific ultrasound frequency value of the species specific deterrence instructions.

In a further embodiment, each of the two or more animal species profiles comprise species specific deterrence instructions specific to the respective animal species, the species specific deterrence instructions comprising species specific ultrasound frequency value to be utilized by the deterrence ultrasound device. The repellence sub-system is configured to carry out the species specific deterrence actions by utilizing the species specific ultrasound value in the deterrence ultrasound device based on the species specific deterrence instructions of the animal species profile corresponding the identified animal species o the detected animal.

In a yet further embodiment, each of the two or more animal species profiles comprise species specific deterrence instructions specific to the respective animal species, the species specific deterrence instructions comprising species specific ultrasound frequency value to be utilized by the deterrence ultrasound device. The repellence sub-system is configured to provide the species specific deterrence instructions of the animal species profile corresponding the identified animal species of the detected animal to the deterrence ultrasound devices, the species specific deterrence instructions comprising a species specific ultrasound frequency value, and operate the deterrence ultrasound device with the species specific ultrasound frequency value of the species specific deterrence instructions of animal species profile corresponding the identified animal species of the detected animal.

Different animal species have different hearing ranges and therefore different ultrasound frequencies and sound frequencies are efficient in repelling different animal species. Ultrasound is efficient in repelling animals and it does not harm the animals. Ultrasound is also be silent to humans in high-frequencies over 20 kHz.

In some embodiments, the one or more deterrence devices are arranged to the train.

In some further embodiments, the one or more deterrence devices are arranged to the cockpit of the train.

Accordingly, the animals may be repelled from the railway track with the deterrence devices provided to the train and thus the train itself may be utilized for repelling the animals from the railway track during the movement of the train.

In some embodiments, the one or more repellence devices are arranged to the train are directed to towards the railway track and in the forward moving direction of the train such that the deterrence actions are directed towards the railway track in the forward moving direction of the train.

In some other embodiments, the one or more repellence devices are arranged to the cockpit of the train are directed to towards the railway track and in the forward direction of the train such that the deterrence actions are directed towards the railway track in the forward direction of the train.

In some further embodiments, the deterrence sound device or deterrence ultrasound device is arranged to the train or to the cockpit of the train are directed to towards the railway track and in the forward moving direction of the train such that the deterrence actions are directed towards the railway track in the forward moving direction of the train.

The deterrence sound device or deterrence ultrasound device comprises a sound source element, such as a speaker, configured to emit deterrence sound or deterrence ultrasound. The sound source element is directed to towards the railway track and in the forward moving direction of the train such that the deterrence sound or deterrence ultrasound is directed towards the railway track in the forward moving direction of the train.

In some yet further embodiments, the deterrence light device is arranged to the train or to the cockpit of the train and directed to towards the railway track and in the forward direction of the train such that the deterrence actions are directed towards the railway track in the forward direction of the train.

The deterrence light device comprises a light source element, such as a LED or LED and reflector or some other light source or light source and a reflector, configured to emit deterrence light. The light source element is directed to towards the railway track and in the forward moving direction of the train such that the deterrence light is directed towards the railway track in the forward moving direction of the train.

In some further embodiments, the deterrence sound device or deterrence ultrasound device and the deterrence light device are arranged to the train or to the cockpit of the train are directed to towards the railway track and in the forward direction of the train such that the deterrence actions are directed towards the railway track in the forward direction of the train.

In some embodiments, the one or more deterrence devices are provided as fixed deterrence devices arranged in connection with the railway track or adjacent the railway track.

In some further embodiments, the repellence system comprises several the deterrence devices provided as fixed deterrence devices arranged in connection with the railway track or adjacent the railway track along length of the railway track.

Accordingly, when the repellence sub-system detects an animal in the image data received from imaging device in the train, the repellence sub-system is configured to provide the deterrence instructions and is configured communicate the deterrence instructions to the fixed deterrence devices.

In some embodiments, the train is provided with a navigation device configured to provide train location data of the train. The navigation device arranged in data transfer connection with the repellence sub-system. The repellence sub-system is configured to receive the location data from the navigation device. The repellence sub-system is also configured store device location data of the one or more fixed deterrence devices. The one or more fixed deterrence devices are arranged in data transfer connection with the repellence sub-system and configured to receive the species specific deterrence instructions from the repellence sub-system. The repellence sub-system is configured to select one or more fixed deterrence devices based on the device location data of the one or more fixed deterrence devices and the train location data of the navigation device and initiate the species specific deterrence actions in the selected one or more deterrence devices.

Accordingly, the repellence sub-system is configured to initiate the deterrence actions in the fixed deterrence devices which are at or close to the location of the detected animal.

In some embodiments, the one or more fixed repellence devices are directed to towards the railway track such that the deterrence actions are directed towards the railway track.

In some other embodiments, the deterrence sound device or deterrence ultrasound device is directed to towards the railway track such that the deterrence actions are directed towards the railway track.

In some further embodiments, the deterrence light device is directed to towards the railway track such that the deterrence actions are directed towards the railway track.

In some yet further embodiments, the deterrence sound device or deterrence ultrasound device and the deterrence light device are directed to towards the railway track such that the deterrence actions are directed towards the railway track.

The fixed deterrence sound devices, fixed deterrence ultrasound devices and the fixed deterrence light devices may be similar as the deterrence devices provided to the train.

In some embodiments there are deterrence devices arranged to the train and in connection with or adjacent to the railway track as fixed deterrence devices.

The fixed deterrence sound device or fixed deterrence ultrasound device comprises a sound source element, such as a speaker, configured to emit deterrence sound or deterrence ultrasound. The sound source element is directed to towards the railway track such that the deterrence sound or deterrence ultrasound is directed towards the railway track.

The fixed deterrence light device comprises a light source element, such as a LED or LED and reflector or some other light source or light source and a reflector, configured to emit deterrence light. The light source element is directed to towards the railway track such that the deterrence light is directed towards the railway track.

Accordingly, the repellence system of the present invention is used for repelling animals from the travel path or the railway track of the train so that accidents or collisions may be avoided.

In one embodiment, the repellence system is configured to determine distance between the imaging device and the detected animal, and initiate the species specific deterrence actions with the one or more deterrence devices based on the determined distance.

Determining the distance between the imaging device or the transport vehicle or the train and the detected animal enables carrying out the deterrence actions based on the determined distance or only when the animal is at a certain distance from the transport vehicle or the train.

In some embodiments, the repellence system is configured to determine distance between the train or the cockpit of the train and the detected animal, and initiate the species specific deterrence actions with the one or more deterrence devices based on the determined distance.

In an alternative embodiment, the repellence system is configured to store a pre-determined deterrence distance threshold value, determine distance between the imaging device and the detected animal, and initiate the species specific deterrence actions with the one or more deterrence devices when the determined distance is equal to or less than the pre-determined deterrence distance threshold value.

In some alternative embodiments, the repellence system is configured to store a pre-determined deterrence distance threshold value, determine distance between the train or the cockpit of the train and the detected animal, and initiate the species specific deterrence actions with the one or more deterrence devices when the determined distance is equal to or less than the pre-determined deterrence distance threshold value.

Accordingly, the deterrence actions are carried out only when the detected animal is within the predetermined deterrence distance such that the deterrence is effective in repelling the animal.

In some embodiments, the distance between the animal and the imaging device is determined with the imaging device or by the repellence sub-system based on data received from the imaging device or by the repellence sub-system based on the image data.

In some other embodiments, the train may be provided with a separate distance measuring device, such as a laser measuring device or an optical measuring device. Accordingly, the distance between the animal and the tarin or the cockpit of the train is determined with the distance measuring device or by the repellence sub-system based on data received from the distance measuring device.

The distance measuring device is directed in the forward moving direction of the train and towards the railway track.

In one embodiment, the repellence sub-system is configured to determine moving direction of the detected animal based on the image data from the imaging device, and initiate the species specific deterrence actions with the one or more deterrence devices based on the moving direction of the detected animal.

In an alternative embodiment, the repellence sub-system is configured to store a pre-determined deterrence distance threshold value, determine moving direction of the detected animal based on the image data from the imaging device, determine distance between the train or the cockpit of the tarin or the imaging device and the detected animal, and initiate the species specific deterrence actions with the one or more deterrence devices based on the determined moving direction of the detected animal when the determined distance is equal to or less than the pre-determined deterrence distance threshold value.

Accordingly, the deterrence sub-system is configured to detect the moving direction of detected animal and initiate the deterrence actions based on the moving direction for making the deterrence actions more effective.

In some embodiments, the repellence sub-system is configured to select the fixed deterrence devices to be activated based on the determined moving direction of the animal. Thus, for example fixed deterrence devices on one side of the railway track may activated based on the moving direction of the detected animal for enhancing the repellence out of the railway track.

The present invention is further based on the idea of providing a method for repelling animals from a railway track. The method is performed by a repellence system. The repellence system comprises an imaging device arranged to a train and directed in forward moving direction of the train along the railway track, one or more deterrence devices and a repellence sub-system having one or more processors and memory storing instructions for execution by the one or more processors. The method comprising:

generating image data from a surveillance area with the imaging device;

detecting an animal in the image data with the repellence sub-system;

identifying animal species of the detected animal in the image data with the repellence sub-system;

defining species specific deterrence instructions based on the identified animal species with the repellence sub-system, and carrying out species specific deterrence actions automatically based on the defined species specific deterrence instructions with the deterrence device by directing the deterrence actions towards the detected and identified animal and towards the railway track for repelling the animal from the railway track.

The method enables detecting and identifying animal species in the railway track and subjecting deterrence actions with the deterrence devices to the detected animal such that the deterrence actions are specific to the identified animal species for efficient repellence. The deterrence actions are further directed towards the detected animal and towards the railway track such that the animal is repelled from the railway track.

In one embodiment, the defining species specific deterrence instructions comprises storing two or more animal species profiles in an identification database of the repellence sub-system, each of the two or more animal species profiles comprising a species specific deterrence instructions species having a species specific ultrasound frequency value, and defining an animal species profile corresponding the identified animal species of detected animal, and the carrying out species specific deterrence actions comprises providing the species specific deterrence instructions of the defined animal species profile to a deterrence ultrasound device, the deterrence ultrasound device being capable of emitting ultrasound at different ultrasound frequencies, and emitting ultrasound with the deterrence ultrasound device, the emitted ultrasound having the species specific frequency value of the species specific deterrence instructions of the defined animal species profile.

Accordingly, species specific ultrasound frequency is used for repelling the animal such that the ultrasound frequency most suitable for different animal species is provided.

The method and embodiment of the method may be carried out with a repellence system as defined above.

Further, it should be noted that different embodiments of the invention as disclosed above may be combined in any suitable manner or as defined by the claims.

An advantage of the invention is that the repellence system and repellence method of the present invention provides increased repellence efficiency as deterrence actions are specific to animal species which needs to be repelled. Further, the invention enables creating detailed repellence actions for different animal species. The invention provides automatic or autonomous repellence system and method which may operate without continuous maintenance and human labour. The method and system further directs the deterrence actions towards the detected animal and towards the railway track such that the animal is efficiently repelled from the railway track without causing harm for other animals or ambient environment.

BRIEF DESCRIPTION OF THE DRAWINGS

The invention is described in detail by means of specific embodiments with reference to the enclosed drawings, in which

FIGS. 8, 9, 10, 11, 12, 13 and 14 show schematically flow charts of different embodiments of the repellence method according to the present invention.

DETAILED DESCRIPTION OF THE INVENTION

Figure 1:
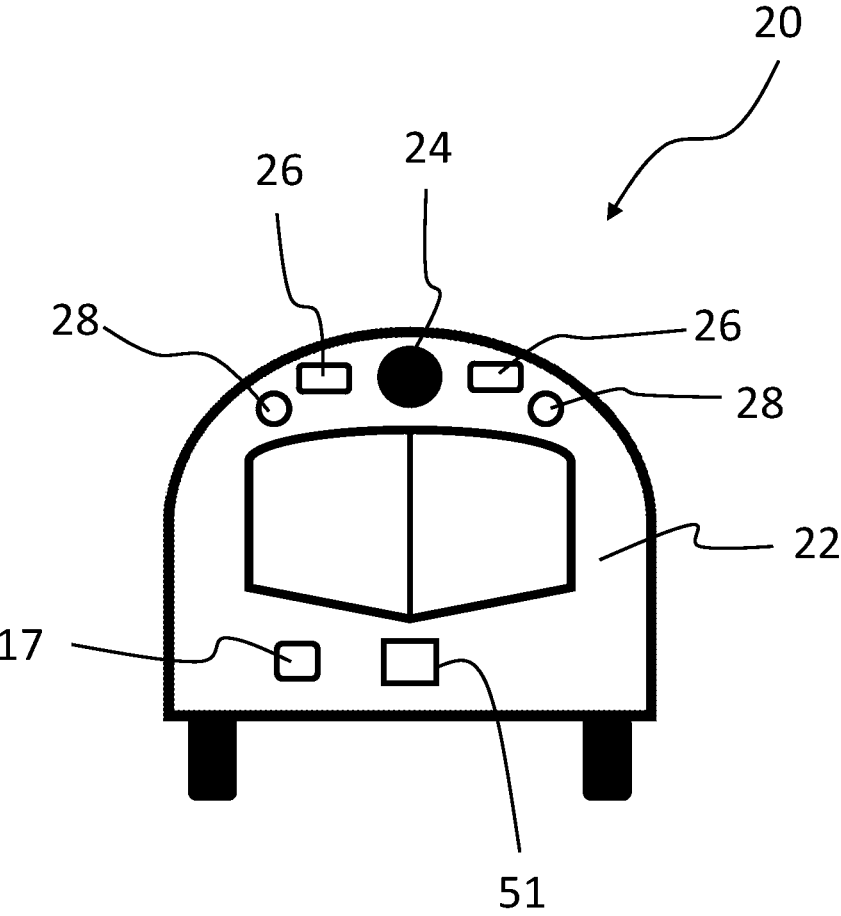
FIG. 1 shows schematically one embodiment of a repellence system provided to a train.

FIG. 1 shows schematically one embodiment of the present invention. In this embodiment the repellence system is provided in connection with a train 20.

As shown in FIG. 1, the repellence system comprises the imaging device 24 arranged to the train 20 or to a front of the train 20 such that the imaging device 24 is directed to the forward moving direction of the train 20 and toward a railway track along which the train 2 is moving.

The imaging device 24 is arranged to a cockpit 22 of the train 20 and directed to the forward moving direction of the train 20.

In some embodiments, the imaging device 24 is provided to the front surface of the cockpit 22 of the train 20.

The imaging device 24 comprises a lens or an image sensor which is directed towards forward moving direction of the train 20 and towards the railway track.

The imaging device 24 is configured to generate image data from the forward moving direction of the train 20 and from the railway track. The generated image data comprises one or more separate images taken with the imaging device 24 or a video taken with the imaging device 24. The video comprises several separate image frames.

The imaging device 24 is provided to or arranged to the train 20 and arranged to generate image data from the direction of ahead of the train 20 or front of the train 20.

The repellence system further comprises one or more repellence sound devices 26 arranged to generate deterrence sound or sounds. The deterrence sound devices 26 are provided to train 20.

The deterrence sound devices 26 are provided to front or cockpit of the train 20 and arranged to emit deterrence sound in the forward moving direction train 20 and towards the railway track.

The deterrence sound devices 26 may comprise a speaker or a sound source or the like sound generator arranged to emit sound or noise for repelling animals. The deterrence sound devices 26 or the sound sources thereof are directed towards forward moving direction of the train 20 and towards the railway track.

In some embodiments, the deterrence sound devices 26 are provided to the front surface of the cockpit 22 of the train 20.

In some embodiments, the deterrence sound devices 26 is configured to generate and emit different sounds at different sound volumes and/or sound frequencies. Accordingly, the repellence system is configured to adjust the sound volume and/or sound frequencies generated and emitted by the deterrence sound devices 26.

The repellence system further or alternatively comprises one or more repellence ultrasound devices 26 arranged to generate deterrence ultrasound or ultrasounds. The deterrence sound device 16 is provided to train 20.

The deterrence ultrasound devices 26 are provided to front or cockpit of the train 20 and arranged to emit deterrence ultrasound in the forward moving direction of the train and towards the railway track.

The deterrence ultrasound device 26 may comprise an ultrasound source or the like ultrasound generator arranged to emit ultrasound for repelling animals. The deterrence sound devices 26 or the ultrasound sources thereof are directed towards forward moving direction of the train 20 and towards the railway track.

In some embodiments, the deterrence ultrasound devices 26 are configured to generate and emit ultrasound at different ultrasound frequencies. Accordingly, the repellence system is configured to adjust the ultrasound frequencies generated and emitted by the deterrence ultrasound devices 26.

The repellence system may comprise one or more deterrence sound devices 26 or one or more deterrence ultrasound devices 26 for generating and emitting sound or ultrasound.

Alternatively, the repellence system may comprise one or more deterrence sound devices 26 and one or more deterrence ultrasound devices 26 for generating and emitting both sound and ultrasound. The repellence system may be configured to generate and emit sound and ultrasound simultaneously or at different times.

The repellence system further comprises one or more repellence light devices 28 arranged to generate deterrence light. The deterrence light devices 28 are provided to the train 20.

The deterrence light devices 28 are provided to front or cockpit 22 of the train 20 and arranged to emit deterrence light in the forward moving direction of the train 20 and towards the railway track.

The deterrence light devices 28 may comprise a light source or the like illumination source or element arranged to generate and emit visible light.

The deterrence light devices 28 may comprise for example one or more LED (light emitting diode) elements or laser elements for generating and emitting deterrence light.

The deterrence light devices 28 or the light sources or illumination elements thereof are directed towards the forward moving direction of the train 20 and towards railway track.

In some embodiments, the deterrence light devices 28 are configured to generate and emit different lights at different brightness and/or at different colours. Further, the deterrence light devices 28 are configured to generate and emit continuous light or blinking light. Accordingly, the repellence system is configured to adjust the light brightness, colour and emitting pattern of the deterrence light devices 28.

The repellence system comprises both one or more deterrence light devices 28 and one or more deterrence sound devices 26, or one or more deterrence light devices 28, one or more deterrence sound devices 26 and one or more deterrence ultrasound devices 26 provided to the train 20, or to the front or cockpit 22 of the train 20.

In an alternative embodiment, the repellence system comprises only one or more deterrence light devices 28, or one or more deterrence sound devices 26 or one or more deterrence ultrasound devices 26.

The repellence system further comprises the repellence sub-system 51 having one or more processors and memory storing instructions for execution by the one or more processors.

In the embodiment of FIG. 1, the repellence sub-system 51 is provided to the train 20, as shown in FIG. 1. The imaging device 24 and the one or more deterrence devices 26, 28 are connected or operatively connected to the repellence sub-system 51.

In an alternative embodiment, the repellence sub-system 51 is provided to an external repellence server (not shown) and the train 20 is provided with a repellence system communication module (not shown) configured to provide communication connection with the external server and the repellence sub-system 51 in the external repellence sever. The repellence system communication module is configured to transmit and receive data, or exchange data, with the external repellence server and the repellence sub-system 51. The imaging device 24 and the one or more deterrence devices 26, 28 are connected or operatively connected to the repellence system communication module.

The repellence sub-system 51 is configured to receive image data of from the imaging device 24. The repellence sub-system 51 is further configured to detect an animal or animals in the image data and identify animal species of the detected animal or animals in the image data. The repellence sub-system 51 is also configured to generate species specific deterrence instructions based on the identified animal species in the image data, and to provide species specific deterrence instructions to the one or more deterrence devices 26, 28 based on the identified animal species.

The species specific deterrence instructions comprise instructions for carrying out species specific deterrence actions with the one or more deterrence devices 26, 28. The species specific deterrence instructions are specific to the identified animal species. Thus, the generated species specific deterrence instructions and thus performed species specific deterrence actions are different for different animal species. This provides efficient repellence of animals.

Figure 2:
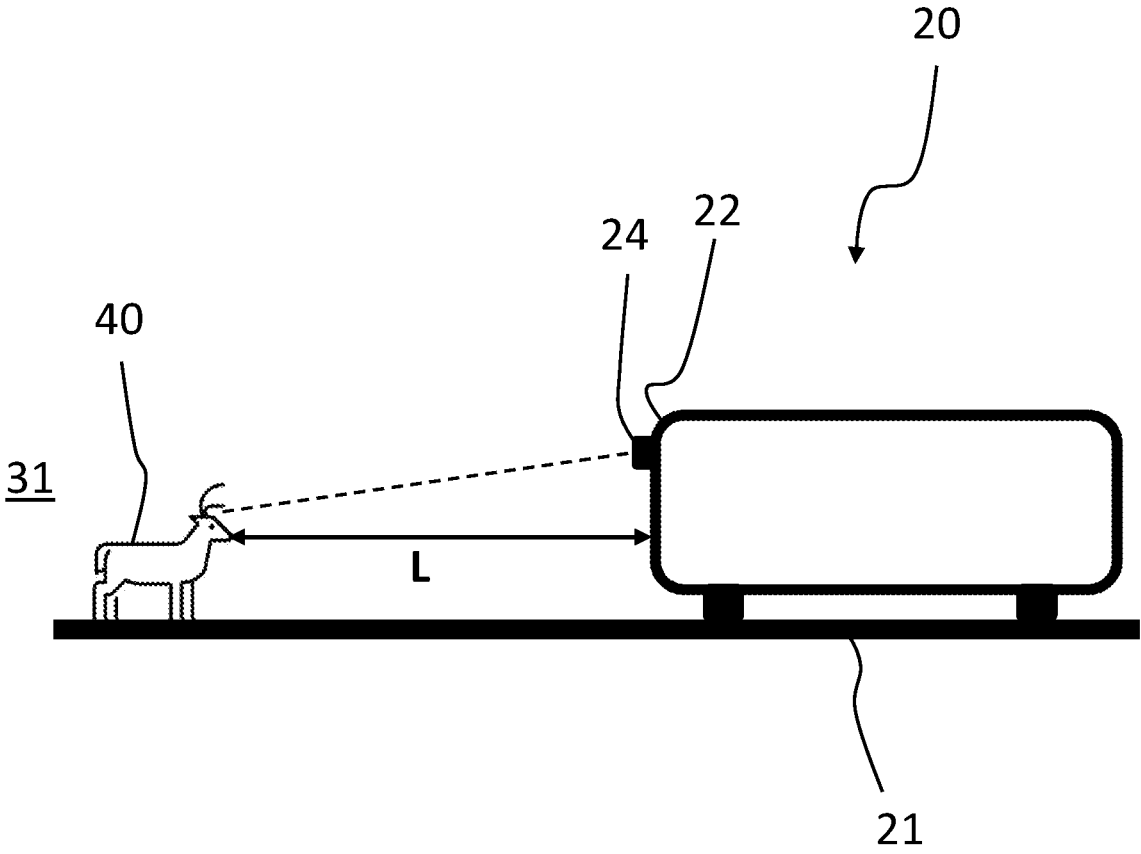
FIGS. 2, 3, 4, 5 and 6 show schematically an operation of a repellence system according to the present invention
Figure 3:
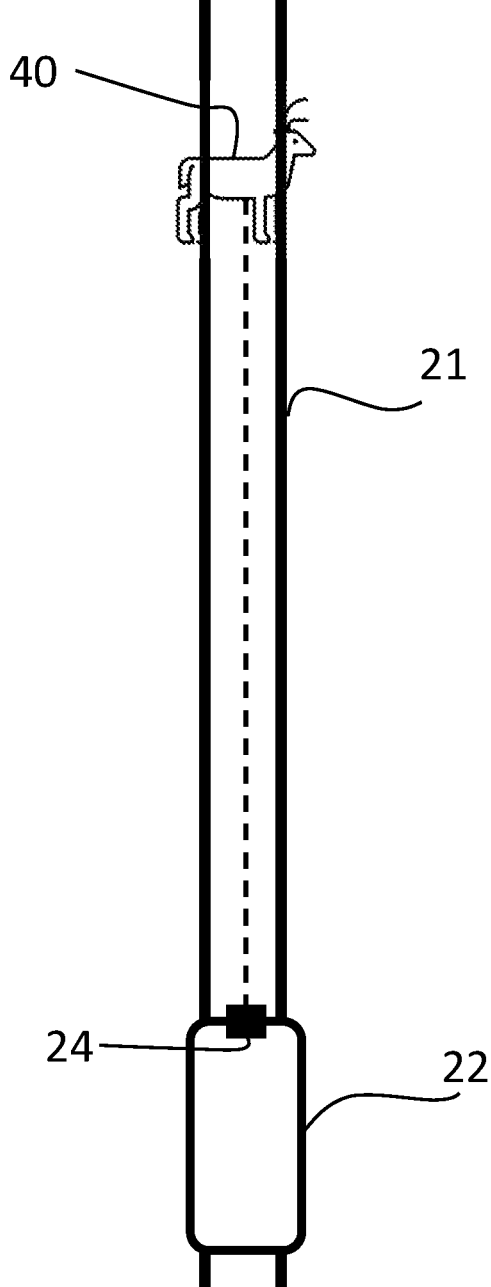

FIGS. 2 and 3 shows schematically one embodiment, in which the repellence system is arranged in connection with or to the train 20. Thus, FIG. 2 schematically shows utilization of the repellence system with the train 20 for repelling animals from the railway track As shown in FIGS. 2 and 3, the repellence system is configured to operate continuously and automatically during movement of the train 20.

In the embodiment of FIG. 2, the train 20 moves in the forward moving direction and along a railway track 21. The repellence system is provided in connection with the train 20. The imaging device 24 is provided to the front or cockpit 22 of the train 20 and directed towards the forward moving direction of the train 20 and towards the railway track 21 ahead of the train 20.

The one or more deterrence devices 26, 28 are also provided to the train 20, and preferably to the front or cockpit 22 of the train 20. The one or more deterrence sound devices 26 or one or more deterrence ultrasound devices 26 are arranged to emit deterrence sounds or deterrence ultrasounds towards the forward moving direction of the train 20 and towards the railway track 21 ahead of the train 20. Similarly, the one or more deterrence light devices 28 are arranged to emit deterrence light towards the forward moving direction of the train and towards the railway track 21 ahead of the train 20.

In connection with the train 20, a surveillance area 31 of the imaging device 24 is towards the forward moving direction of the train 20, as shown in FIG. 2. Thus, the surveillance area 31, or railway track area, is ahead or the direction ahead from the train 20 or the cockpit 22 or front of the train 20.

The imaging device 24 is configured to generate image data from the surveillance area 31 during movement of the train 20 along the railway track 21. The image data is processed with the repellence sub-system 51 continuously and in real-time for detecting and identifying animals in the surveillance area 31.

The object of the repellence system of the present invention is to repel animals detected and identified in the surveillance area 31 out of the way of the train 20 and out of the railway track 21.

In the present invention the animals detected in the surveillance area 31 are identified to identify the species of the animals. Identifying the species of the animal is important such that effective deterrence actions may be used. The effective deterrence actions are specific to the identified animal species.

As shown in FIGS. 2 and 3, the repellence system provided to the train 20 is configured to detect an animal 40 in the surveillance area 31, meaning in the forward moving direction of the train 20 and in the railway track 21. The detection of the animal 40 is carried out by inputting image data generated by the imaging device 24 to the repellence sub-system 51. The repellence sub-system 51 is configured to detect animals 40 in the image data and to further identify species of the detected animals 40.

When the animal 40 is detected by the repellence sub-system 51 in the image data of the imaging device 24, the repellence sub-system 51 is configured to identify species of the detected animal 40. The repellence sub-system 51 comprises specific deterrence instructions for different animal species. Thus, after identification of the animal species of the detected animal 40 with the repellence sub-system 51, the repellence sub-system 51 is configured generate deterrence instructions specific to the identified animal species. The repellence sub-system 51 is further configured to provide the species specific deterrence instructions to the one or more deterrence devices 26, 28 and the deterrence devices 26, 28 are configured to carry out species specific deterrence actions based on the species specific deterrence instructions.

The identification sub-system 51 is configured to detect animal 40 from a distance of 0 to 400, or from a distance of 0 to 300 m, or from a distance of 0 to 200 m depending on the used imaging device 24 and the weather conditions In certain situations, the repellence sub-system 51 is unable to identify the detected animal 40 in the image data. This may be due to great distance between the imaging device 24 and the detected animal 40 or due to for example weather conditions, such as rain or fog. In this case the repellence sub-system 51 is configured to continue identifying the detected animal upon receiving new image data from the imaging device 24.

The repellence sub-system 51 is configured to carry out the detection and identification for each image or image frame received from the imaging device 24. As the train 20 moves in the forward moving direction, the distance between the detected animal 40 and the train 20 or the imaging device 24 decreases. Therefore, the identification of the animal species becomes more accurate as the train 20 approaches the animal 40.

The deterrence actions carried out by the deterrence devices 26, 28 are more efficient when the distance between the detected animal 40 and the transport vehicle is under a predetermined deterrence distance in which the animal 40 is under influence of the deterrence devices 26, 28. Therefore, the deterrence actions are preferably initiated when the distance L between the animal 40 and the train 20 is equal or less than the predetermined deterrence distance threshold value.

The deterrence distance threshold value is pre-determined and further it may be specific to the animal species. Thus, the repellence sub-system 51 is configured to store a pre-determined deterrence distance threshold value, determine distance between the train 20 and the detected animal 40 continuously as the transport vehicle 20 is moves forward along the railway track 21, and initiate the species specific deterrence actions with the one or more deterrence devices 26, 28 when the determined distance is equal to or less than the pre-determined deterrence distance threshold value.

Determining the distance L between the train 20 and the detected animal 40 is carried out from the image data with the repellence sub-system 51. Therefore, the distance between the train 20 and the detected animal 40 is determined continuously from images or from each image or each image frame.

Alternatively, the train 20 is provided with a distance measurement device (not shown), such as a laser measurement device, generating distance measurement data and being connected to or operatively connected to the repellence sub-system 51. Further alternatively, the imaging device 24 is configured to generate distance measurement data.

Alternatively, the identification subs-system 51 is connected to a train control system (not shown) and configured to receive velocity data from the transport vehicle control system or train control system. The repellence sub-system 51 is configured to determine the distance between the train 20 and the detected animal 40 based on the velocity data and the image data.

In the embodiments of FIGS. 1 to 3, the deterrence devices 26, 28 are all provided to the train 20.

Figure 4:
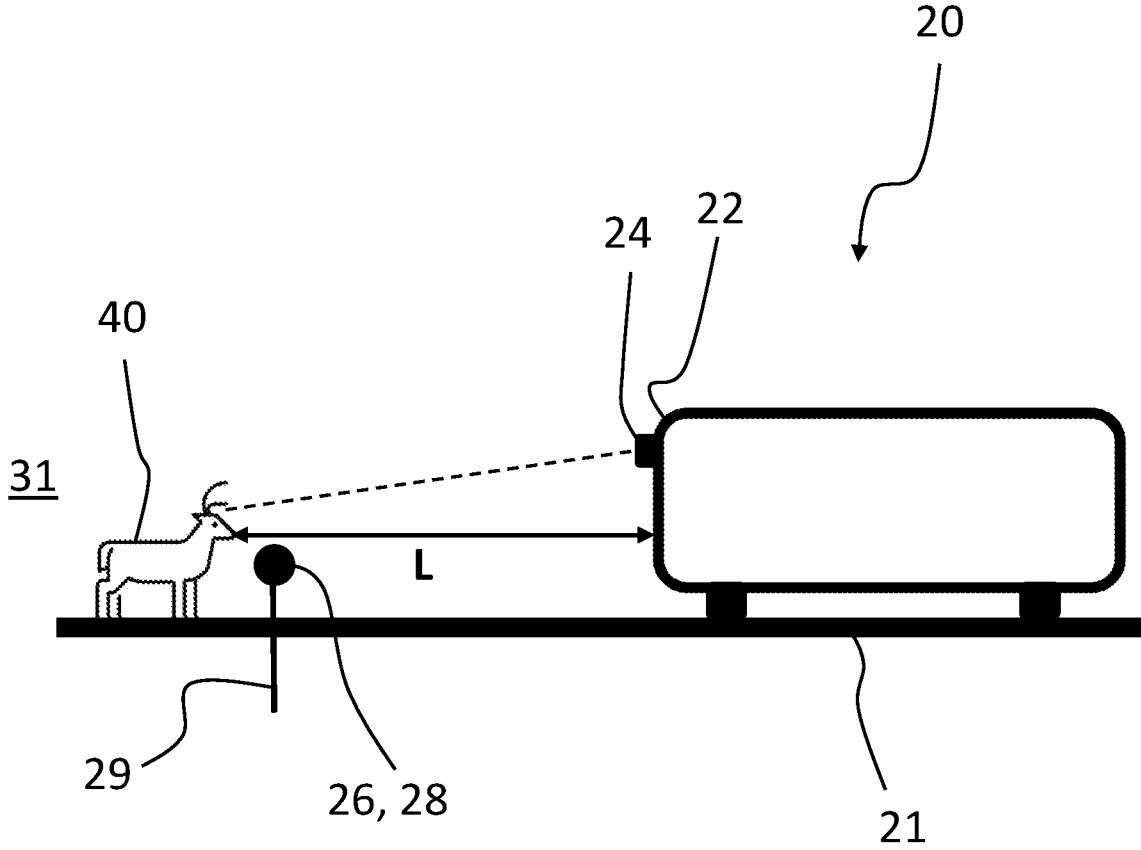
Figure 5:
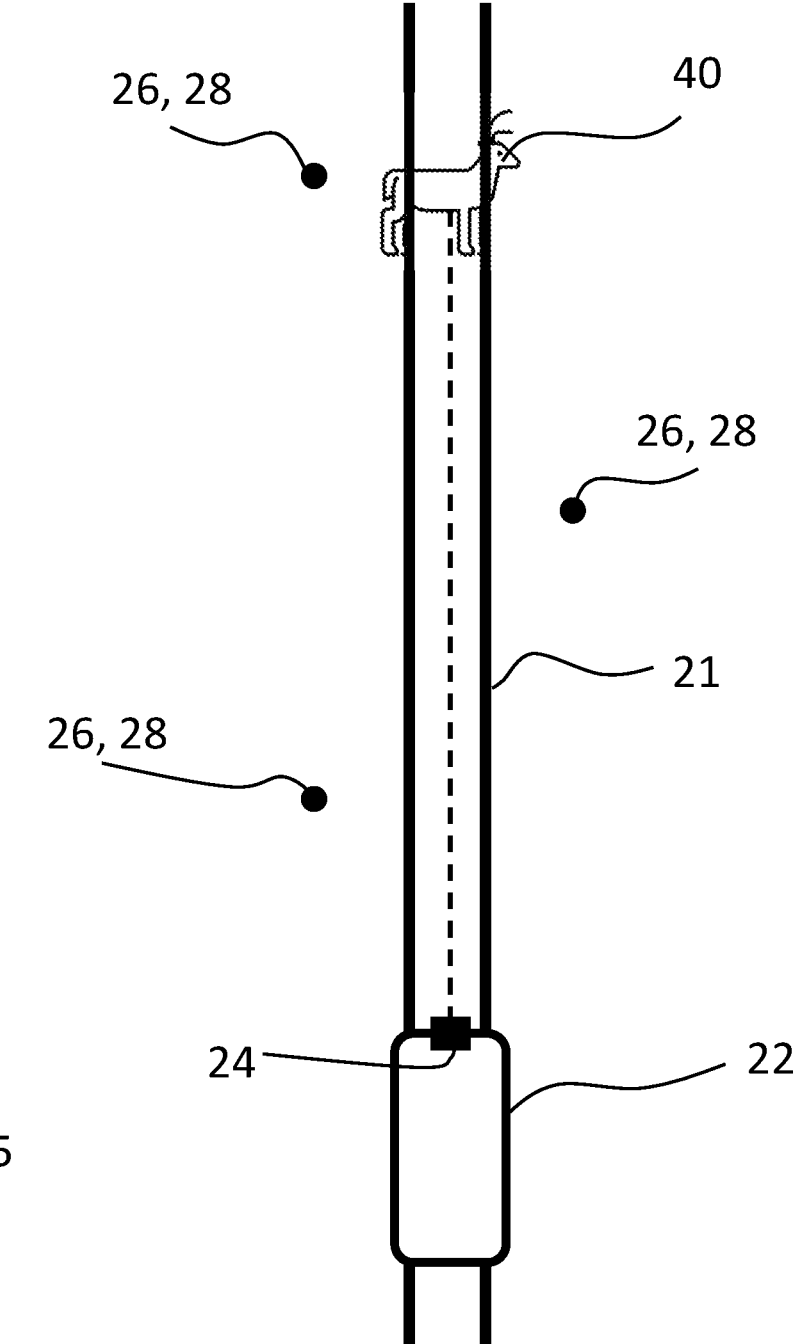
Figure 6:
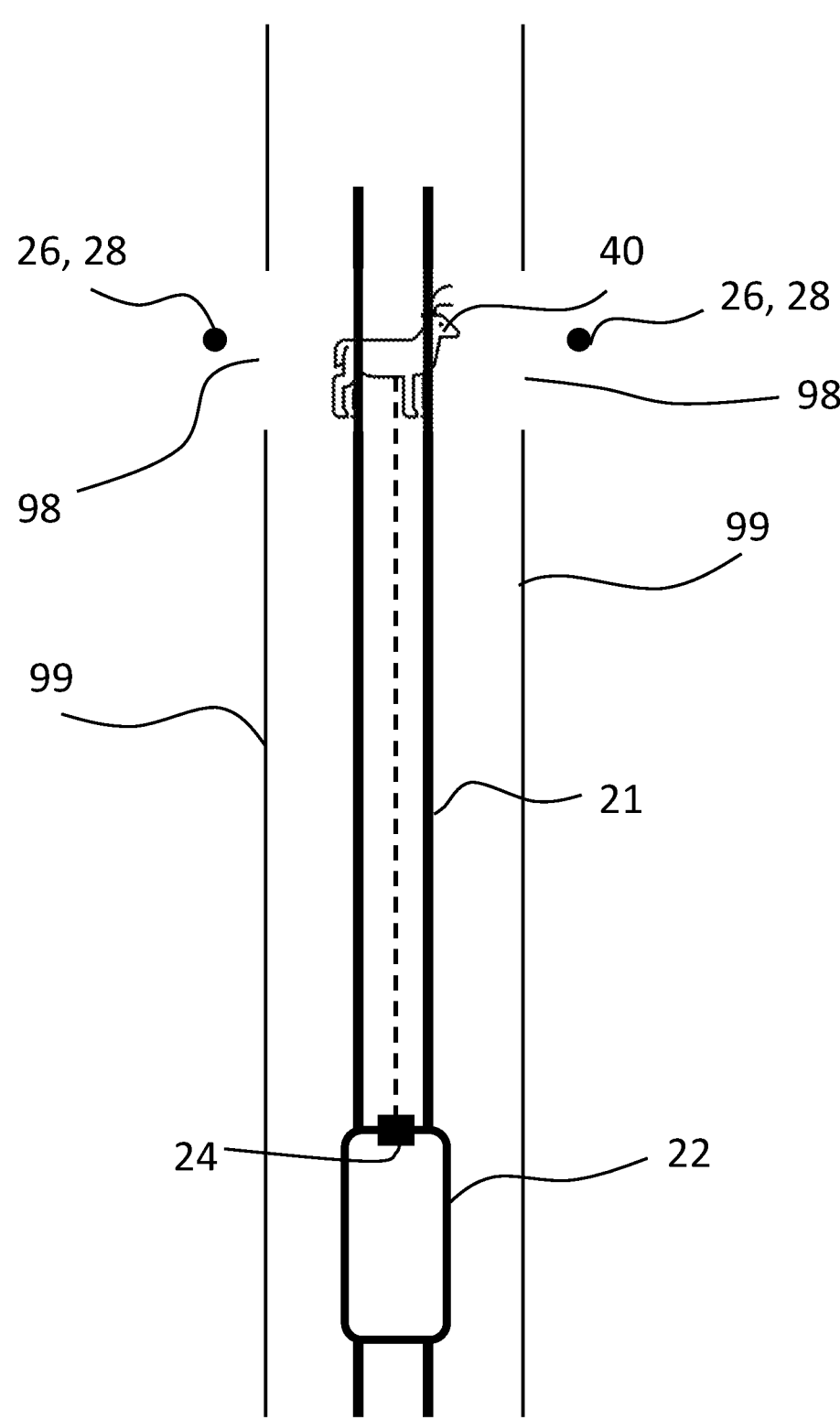

FIGS. 4 to 6 show schematically an alternative embodiment, in which the separate deterrence units 29 are provided in connection with or adjacent to the railway track 21.

In the embodiment of FIGS. 4 to 6, the imaging device 24 is provided to the train 20 similarly as in the embodiments of FIGS. 1 to 3.

In the embodiment of FIGS. 4 to 6, the repellence sub-system 51 is configured to operate in similar manner as in the embodiments of FIGS. 1 to 3. The repellence sub-system 51 is provided to the train 20 or to the external repellence server.

The separate deterrence units 29 may be provided with support structure, such as a pillar, post or the like. In some embodiments, the support structure may be a light pole or fence post.

The one or more deterrence devices 26, 28 are provided to or supported to the support structure of the separate deterrence units 29.

The support structure of the separate deterrence unit 29 may be any support structure capable of supporting the one or more deterrence devices 26, 28.

The separate deterrence units 29 are provided with one or more deterrence sound devices 26 and/or one or more deterrence ultrasound devices 26.

Alternatively, the separate deterrence units 29 are provided with one or more deterrence light devices 28.

Further alternatively, the separate deterrence units 29 are provided with one or more deterrence sound devices 26 and/or one or more deterrence ultrasound devices 26 and with one or more deterrence light devices 28.

The deterrence sound devices 26 are provided to front or cockpit of the train 20 and arranged to emit deterrence sound towards the railway track 21. The deterrence sound device 26 is provided to the separate deterrence units 29.

The deterrence sound devices 26 may comprise the speaker or the sound source or the like sound generator arranged to emit sound or noise for repelling animals. The deterrence sound devices 26 or the sound sources thereof are directed towards the railway track 21.

The repellence system further or alternatively comprises one or more repellence ultrasound devices 26 arranged to generate deterrence ultrasound or ultrasounds. The deterrence ultrasound devices 26 is provided to the separate deterrence units 29.

The deterrence ultrasound device 26 may comprise the ultrasound source or the like ultrasound generator arranged to emit ultrasound for repelling animals. The deterrence ultrasound devices 26 or the ultrasound sources thereof are directed towards the railway track 21.

The repellence system may comprise one or more deterrence sound devices 26 or one or more deterrence ultrasound devices 26 provided to the separate deterrence units 29 for generating and emitting sound or ultrasound.

Alternatively, the repellence system may comprise one or more deterrence sound devices 26 and one or more deterrence ultrasound devices 26 provided to the separate deterrence units 29 for generating and emitting both sound and ultrasound. The repellence system may be configured to generate and emit sound and ultrasound simultaneously or at different times.

The repellence system further comprises one or more repellence light devices 28 arranged to generate deterrence light. The deterrence light devices 28 are provided to the separate deterrence units 29.

The deterrence light devices 28 are arranged to emit deterrence light in the towards the railway track 21.

The deterrence light devices 28 may comprise a light source or the like illumination source or element arranged to generate and emit visible light.

The deterrence light devices 28 may comprise for example one or more LED (light emitting diode) elements or laser elements for generating and emitting deterrence light.

The deterrence light devices 28 or the light sources or illumination elements thereof are directed towards the railway track 21.

In some embodiments, the deterrence light devices 28 are configured to generate and emit different lights at different brightness and/or at different colours. Further, the deterrence light devices 28 are configured to generate and emit continuous light or blinking light. Accordingly, the repellence system is configured to adjust the light brightness, colour and emitting pattern of the deterrence light devices 28.

The repellence system comprises both one or more deterrence light devices 28 and one or more deterrence sound devices 26, or one or more deterrence light devices 28, one or more deterrence sound devices 26 and one or more deterrence ultrasound devices 26 provided to the separate deterrence units 29.

In an alternative embodiment, the repellence system comprises only one or more deterrence light devices 28, or one or more deterrence sound devices 26 or one or more deterrence ultrasound devices 26 provided to the separate deterrence units 29.

In the embodiments of FIG. 3 to 6, the separate deterrence units 29 are arranged to form fixed deterrence devices arranged in connection with the railway track or adjacent the railway track.

The repellence system comprises several fixed deterrence devices 26, 28 of separate deterrence units 29 arranged in connection with the railway track 21 or adjacent the railway track 21 along length of the railway track 21.

The separate deterrence units 29 and/or the fixed deterrence devices 26, 28 are provided with a deterrence device communication module (not shown) configured to provide communication connection with the repellence sub-system 51. The deterrence device communication module is configured receive the deterrence instructions or species specific deterrence instructions from the repellence sub-system 51. The fixed deterrence devices 26, 28 are connected or operatively connected to the repellence sub-system 51. The fixed deterrence devices 26, 28 are configured to carry out deterrence actions or species specific deterrence actins based on the received deterrence instructions or species specific deterrence instructions.

Deterrence actions are efficient when the animal 40 is under influence of the deterrence devices 26, 28. Further, deterrence actions are efficient when the distance L between the detected animal 40 and the train 20 is under the predetermined deterrence distance. Thus, the relevant fixed deterrence devices 26, 28 need to be activated and also at a right time when the train is approaching the animal.

Accordingly, the repellence sub-system 51 is configured to initiate the deterrence actions with the fixed deterrence devices 26, 28 when the distance L between the animal 40 and the train 20 is equal or less than the predetermined deterrence distance threshold value.

Further, the repellence sub-system 51 is configured to initiate the deterrence actions in one or more selected fixed deterrence devices 26, 28 which are provided at the location or in vicinity of the location of the detected animal 40.

The deterrence distance threshold value is pre-determined and further it may be specific to the animal species. Thus, the repellence sub-system 51 is configured to store a pre-determined deterrence distance threshold value, determine distance between the train 20 and the detected animal 40 continuously as the transport vehicle 20 is moves forward along the railway track 21, and initiate the species specific deterrence actions with the one or more fixed deterrence devices 26, 28 when the determined distance is equal to or less than the pre-determined deterrence distance threshold value.

Determining the distance L between the train 20 and the detected animal 40 is carried out from the image data with the repellence sub-system 51. Therefore, the distance between the train 20 and the detected animal 40 is determined continuously from images or from each image or each image frame.

Alternatively, the train 20 is provided with a distance measurement device (not shown), such as a laser measurement device, generating distance measurement data and being connected to or operatively connected to the repellence sub-system 51. Further alternatively, the imaging device 24 is configured to generate distance measurement data.

In order to select fixed deterrence devices 26, 28 located at the location of the animal 40 or in the vicinity thereof, the location of the animal 40 and/or the train needs to be defined.

In some embodiments, the train 20 is provided with a navigation device 17 configured to provide train location data of the train 20, as shown in FIG. 1, In some embodiments, the navigation device 17 comprises global navigation satellite system (GNSS) receiver, such as Global Positioning System (GPS) receiver. The navigation device 17 or the GNSS receiver thereof is configured to receive location data from a GNSS satellite and provide train location data representing geographical location of tarin 20 during the movement of the train 20.

The navigation device 17 is arranged in data transfer connection with the repellence sub-system 51. The repellence sub-system 51 is configured to receive the train location data from the navigation device 17.

The repellence sub-system 51 is configured store device location data of the one or more fixed deterrence devices 26, 28. Accordingly, geographical location of the fixed deterrence devices 26, 28 provided in connection with the railway track 21 are predetermined and stored to the repellence sub-system 51, thus they are known.

The one or more fixed deterrence devices 26, 28 are arranged in data transfer connection with the repellence sub-system 51 and configured to receive the deterrence instructions or the species specific deterrence instructions from the repellence sub-system 51.

When the repellence sub-system 51 detects or detects and identifies the animal 40 in the image data, the repellence sub-system 51 is configured to define the location of the train 20 by utilizing the train location data from the navigation device 17.

Then the repellence sub-system 51 is configured to select one or more fixed deterrence devices 26, 28 based on the device location data of the one or more fixed deterrence devices 26, 28 and the train location data of the navigation device 17 and initiate the species specific deterrence actions in the selected one or more deterrence devices 26, 28.

Accordingly, the repellence sub-system 51 is configured to select one or more fixed deterrence devices 26, 28 which are at the location of or in the vicinity of the location of the detected animal 40 or the train 20 based on the device location data of the one or more fixed deterrence devices 26, 28 and the train location data of the navigation device 17 and initiate the species specific deterrence actions in the selected one or more deterrence devices 26, 28. Therefore, only the fixed deterrence devices 26, 28 in the vicinity of the detected animal 40 or the train 20 are activated.

In some embodiments, the train location data, device location data and the distance L between the detected animal 40 and the imaging device 24 or the train 20 are utilized for selecting one or more fixed deterrence devices 26, 28.

Therefore, the repellence sub-system 51 is configured to select one or more fixed deterrence devices 26, 28 based on the device location data of the one or more fixed deterrence devices 26, 28, the train location data of the navigation device 17 and based on the determined distance between the detected animal 40 and the train 20 or the imaging device 24, and initiate the species specific deterrence actions in the selected one or more deterrence devices 26, 28.

FIG. 6 shows an embodiment in which there is a fence 99 extending along the railway track 21 on both sides of the railway track 21. Both fences 99 comprise a crossing opening 98 opposite each other for allowing wild animals 40 to cross the railway track 21. Therefore, a predefined crossing location over the railway track 21 is provided for the animals 40.

The crossing openings 98 are both provided with the fixed deterrence devices 26, 28 or with the separate deterrence unit 29.

In some embodiments, the repellence sub-system 51 is configured to determine moving direction of the detected animal 40 based on the image data from the imaging device 14, provide the deterrence instructions to the fixed deterrence devices and initiate the deterrence actions or species specific deterrence actions with the one or more deterrence devices 26, 28 based on the determined moving direction of the detected animal 40.

Accordingly, the repellence sub-system 51 is configured to select the fixed deterrence devices 26, 28 which are on the side of the railway track 21 from which the detected animal is coming to cross the railway track 21 based on the determined moving direction. This enhances and speeds up the repellence of the animal 40 out from the railway track 21.

It should be noted that the embodiments of FIGS. 1 to 3 and FIGS. 4 to 6 may be combined. Accordingly, the repellence system 50 comprises repellence devices 26, 28 arranged to the train 20 and fixe repellence devices arranged in connection with or adjacent to the railway track 21.

FIG. 7 to 14 disclose operation of the repellence system 50 of the present invention. The disclosed operation is common for all embodiments o the present invention.

Figure 7:
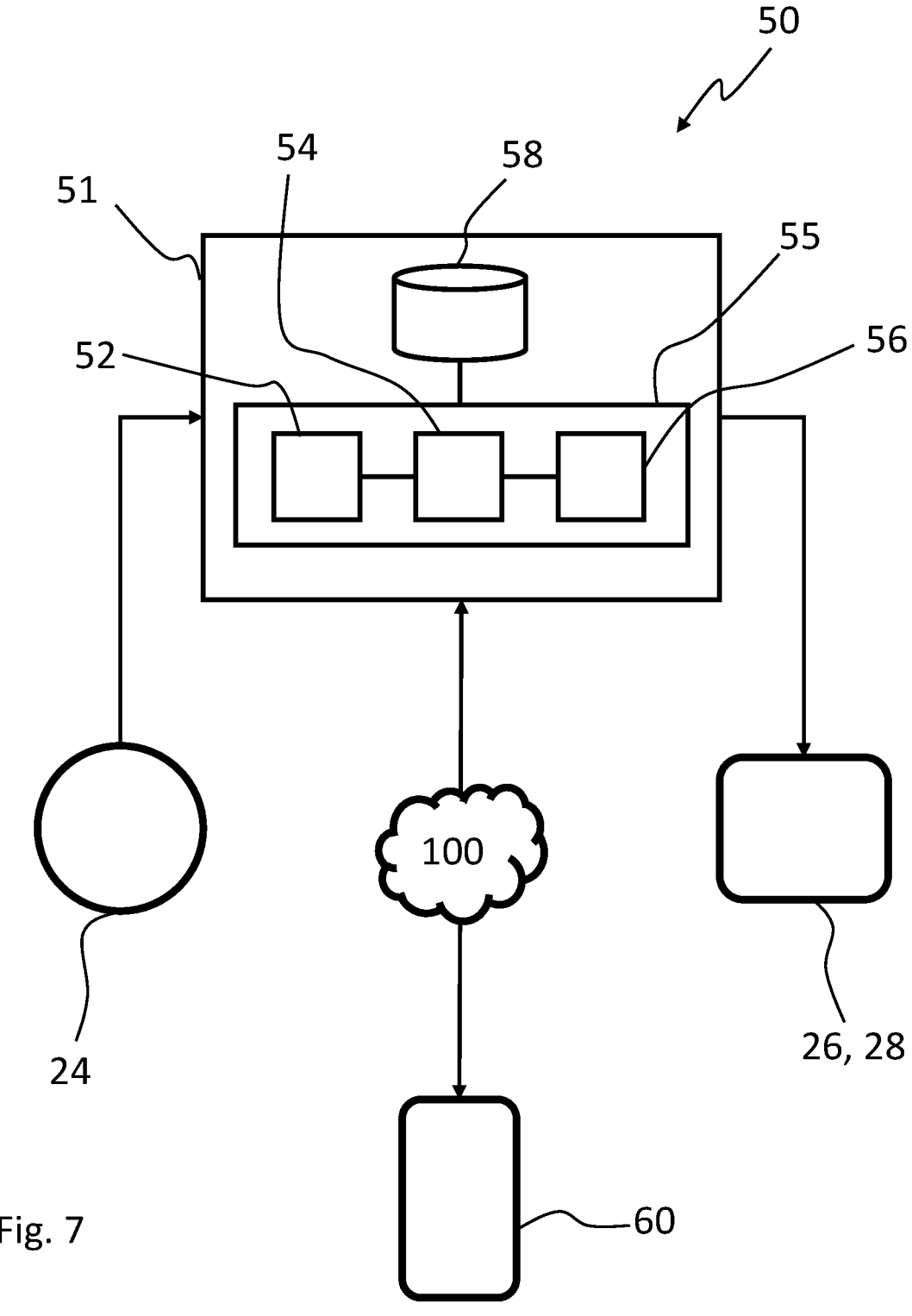
FIG. 7 shows a schematic representation of one embodiment of the repellence system according to the present invention.

FIG. 7 shows schematically the repellence system 50 according to the present invention. The repellence system 50 comprises the repellence sub-system 51 having repellence unit 55. The repellence unit 55 comprises one or more processors 52 and a memory 54 storing instructions 56 for execution by the one or more processors 52.

The imaging device 24 of the train is connected to the repellence sub-system 51 and the repellence sub-system 51 is configured to receive image data from the imaging device 24. The repellence sub-system 51, or the repellence unit 55, is configured to detect an animal in the image data, identify animal species of the detected animal in the image data, and provide species specific deterrence instructions to the one or more deterrence devices 26, 28 based on the identified animal species for carrying out species specific deterrence actions with the deterrence device 26, 28. The species specific deterrence instructions are specific to the identified animal species.

The deterrence devices 26, 28 are connected to the repellence sub-system 51 and configured to receive the species specific deterrence instructions from the repellence sub-system 51.

In the embodiment of FIGS. 1 to 3, the deterrence devices 26, 28 are directly connected to the repellence sub-system 51 and configured to receive the species specific deterrence instructions from the repellence sub-system 51.

In the embodiment of FIGS. 4 to 6, the fixed deterrence devices 26, 28 are provided with the deterrence device communication module (not shown) configured to provide communication connection with the repellence sub-system 51. The deterrence device communication module is configured receive the deterrence instructions or species specific deterrence instructions from the repellence sub-system 51. The fixed deterrence devices 26, 28 are connected or operatively connected to the repellence sub-system 51.

The repellence system 50 further comprises a user device 60 connected to the repellence sub-system 51 over a communication network 100. The user device 60 may be a computer, mobile user device, mobile phone, tablet computer or the any other known user device. The communication network 100 may be Wi-Fi-network, internet, 4G, 5G, Bluetooth, radio frequency network or any other known wireless communication network or a communication line.

The repellence sub-system 51 is configured to generate a notification or alarm upon detection of an animal in the railway track 21 and/or upon detection and identification of an animal in the railway track 21, and providing the alarm or notification to the user device 60 over the communication network 100.

In some embodiments, the train is provided a train communication module (not shown) configured to provide communication connection between the imaging device 24 and the repellence sub-system 51. The repellence sub-system is configured to receive image data from the imaging device via the train communication module.

The train communication module may be connected to the repellence sub-system 51 via the communication network 100.

In the embodiments of FIGS. 3 to 6, the fixed deterrence devices 26, 28 are provided with the deterrence device communication module configured to provide communication connection between the fixed deterrence devices 26, 28

The fixed deterrence devices 26, 28 and the deterrence device communication modules thereof are configured to receive deterrence instructions from the repellence sub-system 51.

The fixed deterrence devices 26, 28 and the deterrence device communication modules thereof are configured to receive deterrence instructions from the repellence sub-system 51 via the communication network 100.

The fixed deterrence devices 26, 28 are connected or operatively connected to the repellence sub-system 51.

The repellence sub-system 51 further comprises an identification database 58 having two or more animal species profiles stored in the identification database 58. Each of the animal species profiles being specific to one animal species. Each animal species profile comprises the species specific deterrence instructions specific to the animal species of the animal species profile.

The identification subsystem 51 is configured to define an animal species profile corresponding the identified animal species of the detected animal 40 based on the identification, and utilize or apply the species specific deterrence instructions of the defined animal species and provide the species specific deterrence instructions to the one or more deterrence device 26, 28 arranged to carry out species specific deterrence actions based on the species specific deterrence instructions.

Figure 8:
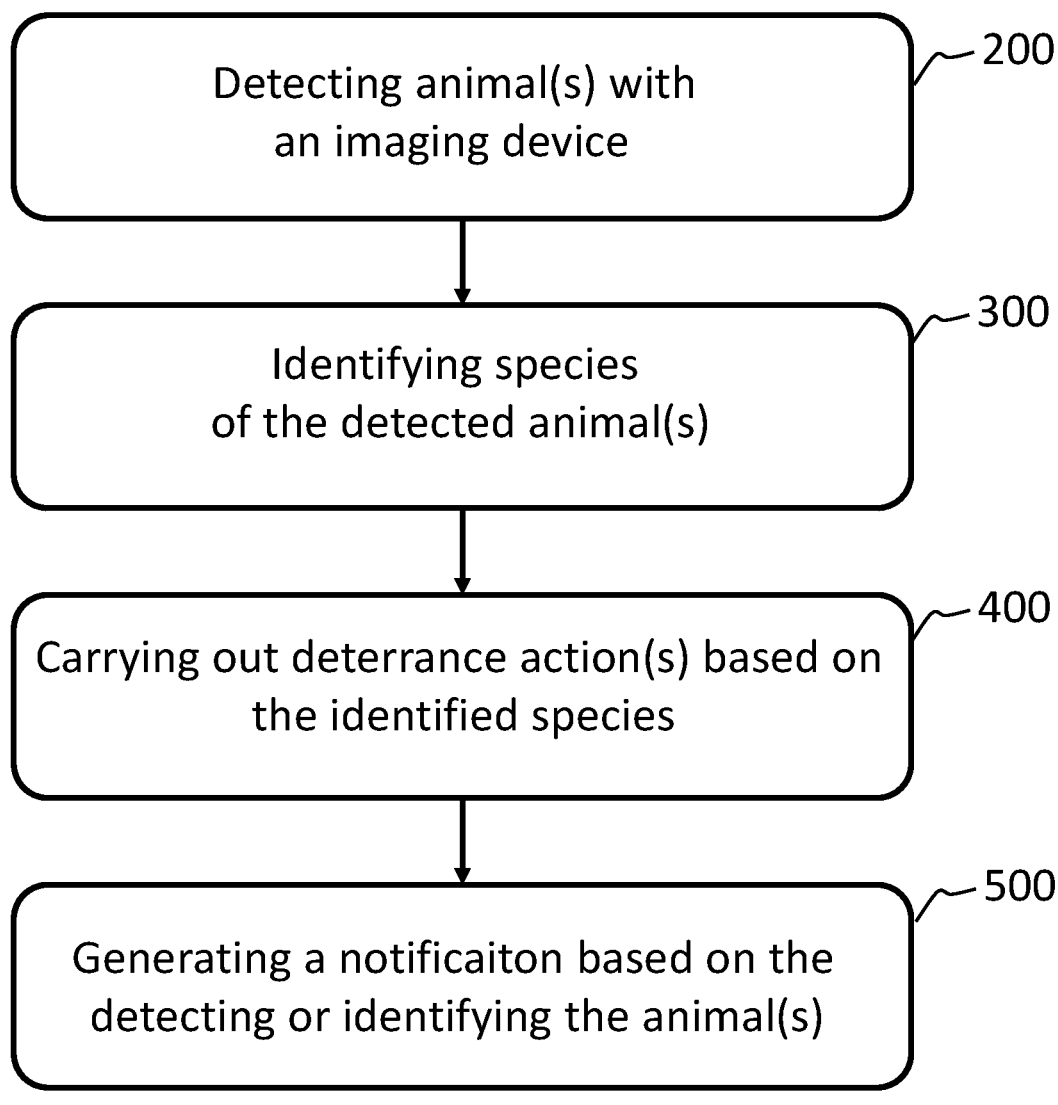

FIG. 8 shows a general flow chart of a repellence method according to the present invention carried out with the repellence system 50. The method comprises generating image data from the forward moving direction of the train and from the railway track 21 with the imaging device 24. The repellence sub-system 51 is configured to receive the image data from the imaging device 24.

Then, in step 200 the repellence sub-system 51 is configured to detect an animal in the image data with the repellence sub-system 51, and further to identify animal species of the detected animal 40 in the image data with the repellence sub-system 51 in step 300.

It should be noted that the steps 200 and 300 may be carried out simultaneously or successively.

In step 400, the repellence sub-system 51 is configured to generate the species specific deterrence instructions based on the identification of the detected animal in step 300. The species specific deterrence instructions are further provided to the one or more deterrence devices 26, 28 in step 400. Step 400 further comprises carrying out deterrence actions with the one or more deterrence devices 26, 28 based on the species specific deterrence instructions. Thus, the one or more deterrence devices 26, 28 are configured to receive the deterrence instructions from the repellence sub-system 51.

The method further comprises step 500 in which the repellence sub-system 51 is configured to generate a notification or alarm based on the detection and/or identification of the animal with the repellence sub-system 51. The step 500 further comprises providing the alarm or notification to the user device 60 over the communication network 100, as disclosed on connection with FIG. 7.

Figure 9:
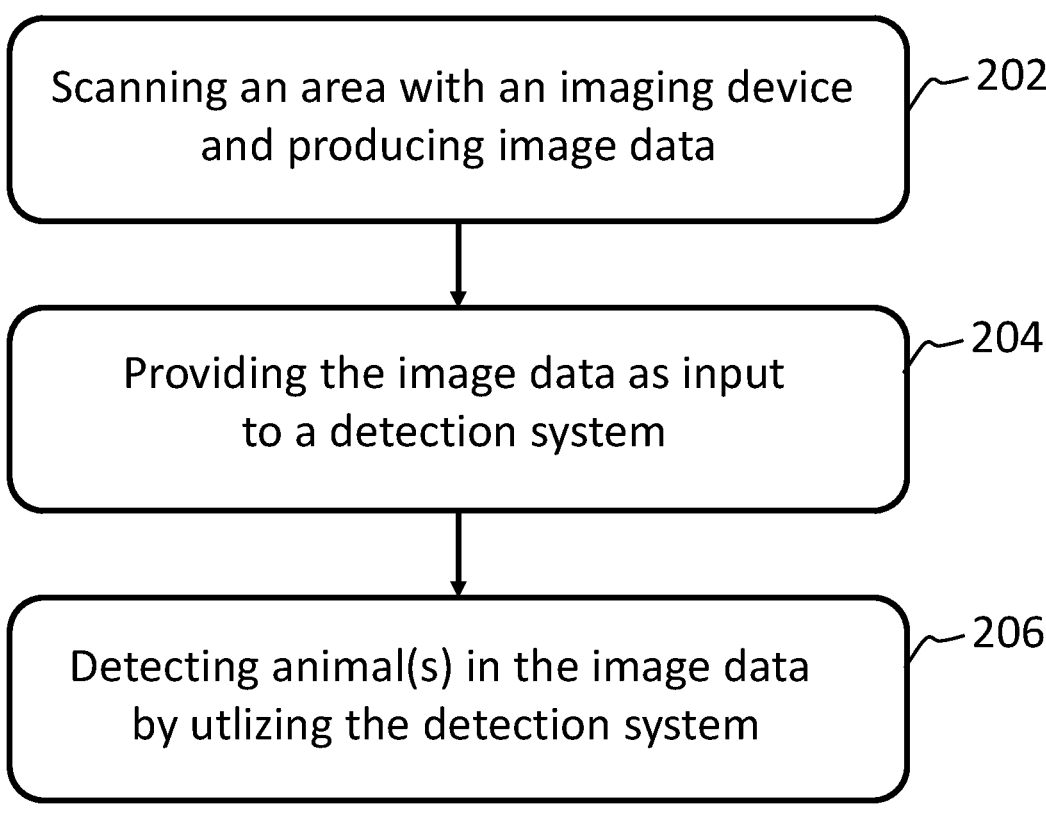

FIG. 9 shows one embodiment of step 200. The step 200 comprises scanning the railway track 21 with the imaging device 24 and producing image data in step 202. The produced image data is provided as input data to the repellence sub-system 51 in step 204. The repellence sub-system 51 is configured to detect animal(s) in the inputted image data in step 206.

Figure 10:
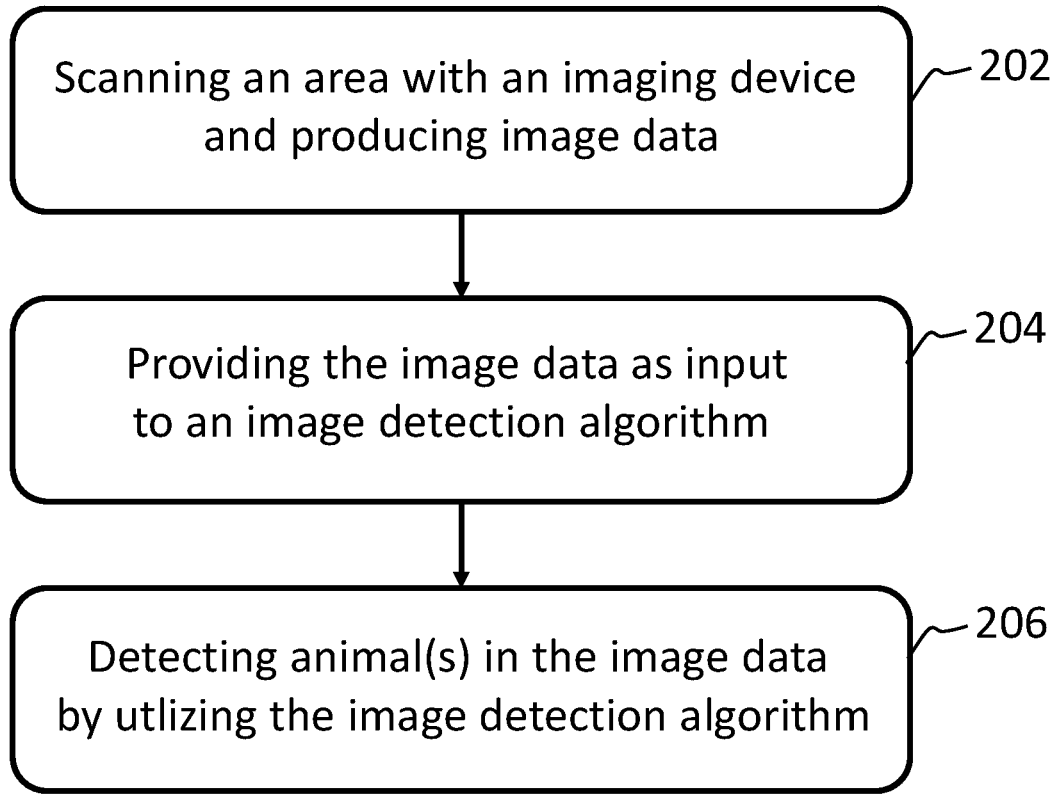

FIG. 10 shows another embodiment of step 200. The step 200 comprises scanning the railway track 21 with the imaging device 24 and producing image data in step 202. The produced image data is provided as input data to an image detection algorithm or computer vision algorithm in the repellence sub-system 51 in step 204. The repellence sub-system 51 and the image detection algorithm or the computer vision algorithm is configured to detect animal(s) in the inputted image data in step 206.

Figure 11:
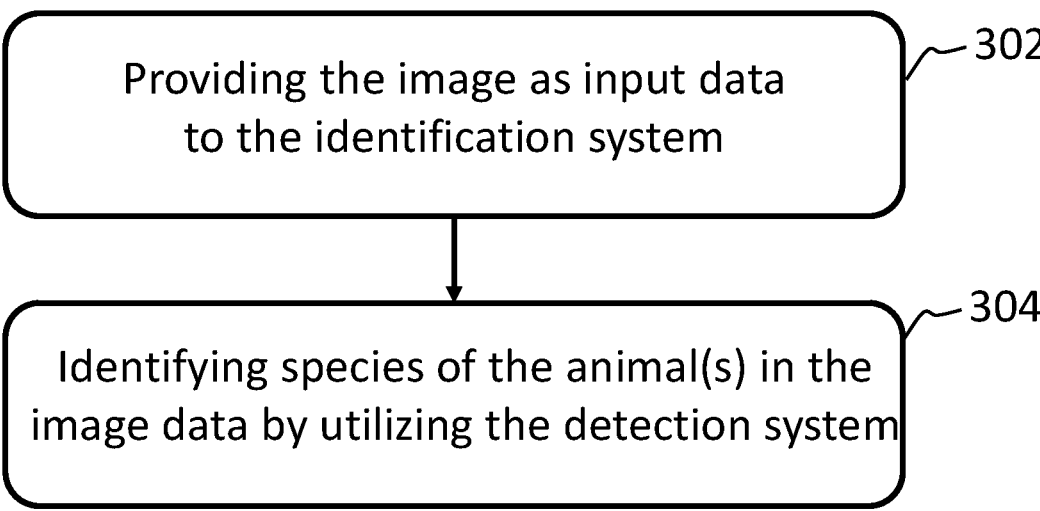

FIG. 11 shows one embodiment of step 300. The step 300 comprises inputting the produced image data as input data to the repellence sub-system 51 in step 302. The repellence sub-system 51 is configured to identify animal species of the detected animal in the inputted image data in step 304.

Figure 12:
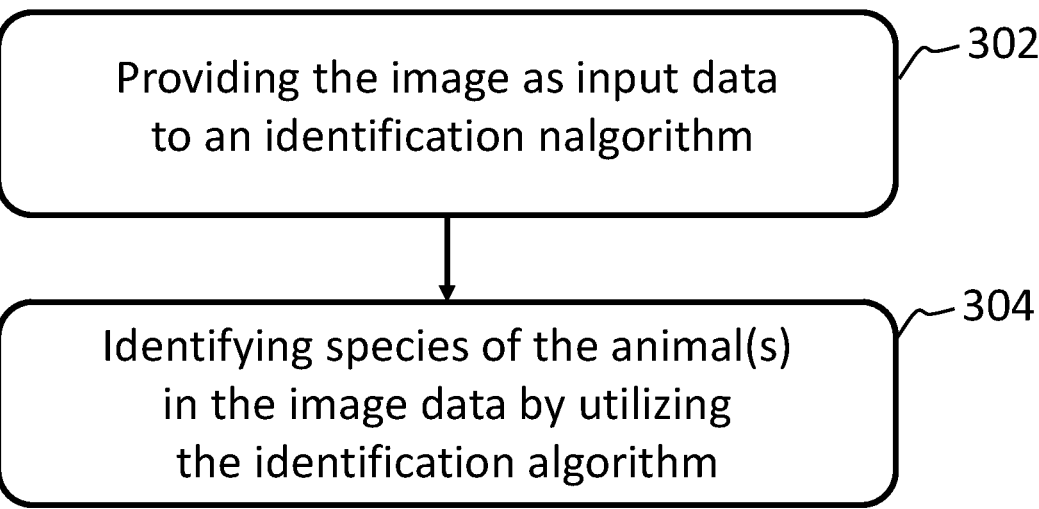

FIG. 12 shows another embodiment of step 300. The step 300 comprises inputting the produced image data as input data to the image detection algorithm or computer vision algorithm in the repellence sub-system 51 in step 302. The repellence sub-system 51 and the image detection algorithm or the computer vision algorithm is configured to identify animal species of the detected animal in the inputted image data in step 304.

The image detection algorithms or computer vision algorithms in steps 200 and 300 are different algorithms.

Alternatively, the image detection algorithms or computer vision algorithms in steps 200 and 300 are one combined algorithm configured to both detect animals in the image data and identify animal species of the detected animals in the image data. In this embodiment, the steps 200 and 300 are combined.

FIG. 13 shows one embodiment of step 400. The step 400 comprises activating the one or more deterrence devices 26, 28 based on the identification of the animal species of the detected animal.

Figure 14:
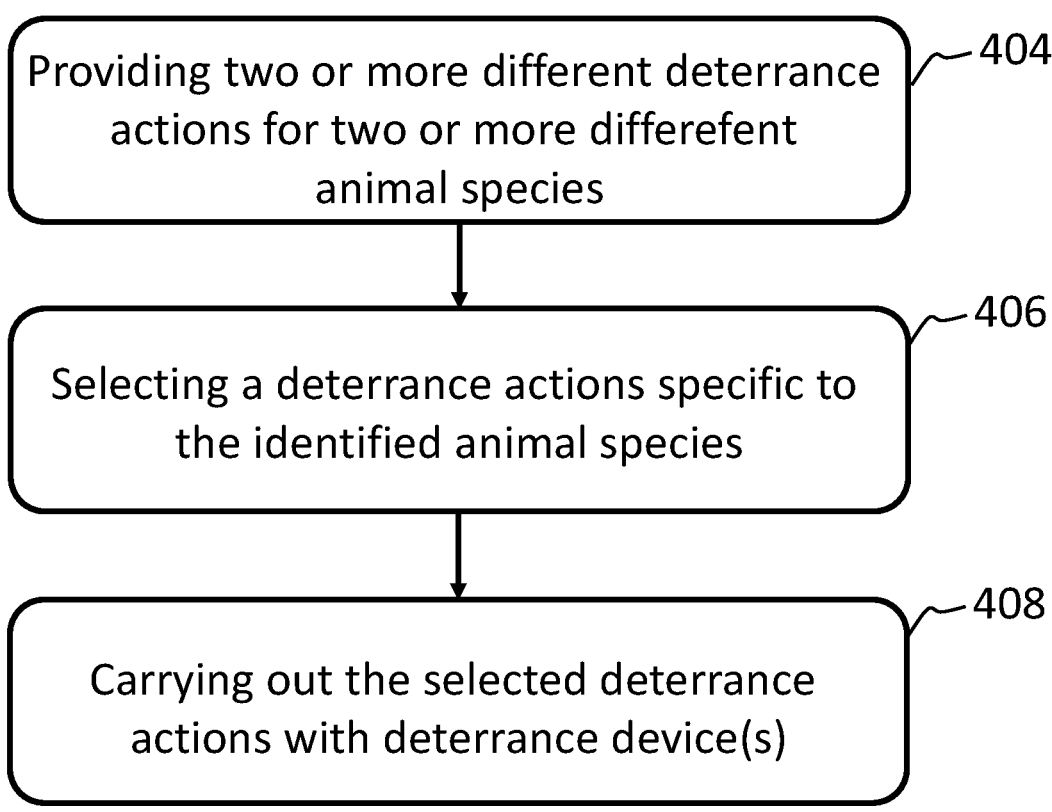

FIG. 14 shows another embodiment of step 400. The step 400 comprises providing two or more different deterrence instructions or deterrence actions for two or more different animal species in step 404. The different deterrence instructions or deterrence actions are provided to the animal species profiles stored in the identification database 58. The step 400 further comprises selecting deterrence instructions or deterrence actions corresponding the identified animal species in step 406. Thee step 406 may comprise selecting an animal species profile corresponding the identified animal species. The step 400 further comprises providing the deterrence instructions of the identified animal species to the one or more deterrence devices 26, 28, and carrying out deterrence actions with the one or more deterrence devices 26, 28 based on the species specific deterrence instructions.

The invention has been described above with reference to the examples shown in the figures. However, the invention is in no way restricted to the above examples but may vary within the scope of the claims.

The invention claimed is:

1. A repellence system for repelling animals from a railway track comprising:

an imaging device configured to generate image data from the railway track, the imaging device being mounted to a train and directed in a forward direction of the train along the railway track;

one or more deterrence devices configured to carry out deterrence actions for repelling animals from the railway track;

wherein the repellence system further comprises:

a repellence sub-system having one or more processors and memory storing instructions for execution by the one or more processors, the repellence sub-system being configured to:

a) receive image data of the railway track from the imaging device during movement of the train in the forward direction along the railway track;

b) detect an animal in the image data with the repellence sub-system, c) identify an animal species of the detected animal in the image data with the repellence sub-system;

d) provide species-specific deterrence instructions to the one or more deterrence devices based on the identified animal species for carrying out species-specific deterrence actions with the one or more deterrence devices, the species-specific deterrence instructions being specific to the identified animal species; and e) initiate the species-specific deterrence actions with the one or more deterrence devices and direct the deterrence actions towards the detected animal and towards the railway track for repelling the detected animal from the railway track;

wherein:

the imaging device is mounted to a cockpit of the train and directed in the forward moving direction of the train;

the one or more deterrence devices comprise a deterrence sound device mounted to the cockpit of the train and directed towards the railway track and in the forward direction of the train;

the deterrence sound device is configured to generate species-specific deterrence sound actions as the deterrence actions in response to the species-specific deterrence instructions such that the deterrence actions are directed towards the railway track in the forward direction of the train; and the repellence sub-system is configured to determine a moving direction of the detected animal based on the image data from the imaging device, and initiate the species-specific deterrence actions with the one or more deterrence devices based on the moving direction of the detected animal.

2. The repellence system according to claim 1, wherein the imaging device comprises:

a thermographic imaging device configured to generate thermographic image data; or an infrared imaging device configured to generate infrared image data; or a digital color imaging device configured to generate color image data; or a LiDAR camera configured to generate range image data; or an RGB-D camera configured to generate range image data.

3. The repellence system according to claim 1, wherein the repellence sub-system comprises an identification database having two or more animal species profiles stored in the identification database, each of the animal species profiles being specific to one animal species, and the repellence sub-system being configured to:

define an animal species profile corresponding to the identified animal species of the detected animal based on the identification; or utilize a classification algorithm as an image identification algorithm, and classify the detected animal as an animal species; and define an animal species profile corresponding to the identified animal species of the detected animal based on the classification; or utilize a classification algorithm as a computer vision algorithm, and classify the detected animal as an animal species; and define an animal species profile corresponding to the identified animal species of the detected animal based on the classification.

4. The repellence system according to claim 1, wherein the one or more deterrence devices comprise:

a deterrence ultrasound device configured to generate a species-specific deterrence ultrasound action as the deterrence action in response to the species-specific deterrence instructions; or a deterrence light device configured to generate a species-specific deterrence light action as the deterrence action in response to the species-specific deterrence instructions; or a deterrence ultrasound device configured to generate a species-specific deterrence ultrasound action and a deterrence light device configured to generate a species-specific deterrence light action as the deterrence actions in response to the species-specific deterrence instructions; or a deterrence ultrasound device configured to generate a species-specific deterrence ultrasound action and a deterrence sound device configured to generate a species-specific deterrence sound action as the deterrence actions in response to the species-specific deterrence instructions.

5. The repellence system according to claim 3, wherein:

i) the repellence sub-system is configured to generate species-specific deterrence instructions based on the identification of the animal species of the detected animal, and provide the generated species-specific deterrence instructions to the one or more deterrence devices; or ii) each of the two or more animal species profiles comprises species-specific deterrence instructions specific to the respective animal species, the species-specific deterrence instructions comprising instructions to carry out species-specific deterrence actions with the one or more deterrence devices specific to the animal species, the repellence sub-system being configured to:

carry out the species-specific deterrence actions based on the species-specific deterrence instructions of the animal species profile corresponding to the identified animal species of the detected animal; or provide the species-specific deterrence instructions of the animal species profile corresponding to the identified animal species of the detected animal to the one or more deterrence devices; and operate the one or more deterrence devices based on the species-specific deterrence instructions corresponding to the animal species profile of the identified animal species of the detected animal to generate species-specific deterrence actions with the one or more deterrence devices.

6. The repellence system according to claim 1, wherein the one or more deterrence devices comprise the deterrence ultrasound device, the repellence sub-system being configured to:

carry out the species-specific deterrence actions by utilizing a species-specific ultrasound frequency value in the deterrence ultrasound device based on the identified animal species of the detected animal, the species-specific deterrence instructions comprising the species-specific ultrasound frequency value; or generate species-specific deterrence instructions comprising a species-specific ultrasound frequency value for the deterrence ultrasound device based on the identified animal species of the detected animal;

provide the generated species-specific deterrence instructions to the deterrence ultrasound device; and operate the deterrence ultrasound device with the species-specific ultrasound frequency value of the species-specific deterrence instructions; or each of the two or more animal species profiles comprises species-specific deterrence instructions specific to the respective animal species, the species specific deterrence instructions comprising a species-specific ultrasound frequency value to be utilized by the deterrence ultrasound device, and the repellence sub-system being configured to:

carry out the species-specific deterrence actions by utilizing the species-specific ultrasound frequency value in the deterrence ultrasound device based on the species-specific deterrence instructions of the animal species profile corresponding to the identified animal species of the detected animal; or provide the species-specific deterrence instructions of the animal species profile corresponding to the identified animal species of the detected animal to the deterrence ultrasound device, the species-specific deterrence instructions comprising a species-specific ultrasound frequency value; and operate the deterrence ultrasound device with the species-specific ultrasound frequency value of the species-specific deterrence instructions of the animal species profile corresponding to the identified animal species of the detected animal.

7. The repellence system according to claim 1, wherein:

the deterrence sound device is mounted to the train or to the cockpit of the train and directed towards the railway track and in the forward direction of the train such that the deterrence actions are directed towards the railway track in the forward direction of the train; or the deterrence light device is mounted to the train or to the cockpit of the train and directed towards the railway track and in the forward direction of the train such that the deterrence actions are directed towards the railway track in the forward direction of the train; or the deterrence sound device or deterrence ultrasound device and the deterrence light device are mounted to the train or to the cockpit of the train and directed towards the railway track and in the forward direction of the train such that the deterrence actions are directed towards the railway track in the forward direction of the train.

8. The repellence system according to claim 1, wherein:

the one or more deterrence devices are provided as fixed deterrence devices arranged in connection with the railway track or adjacent to the railway track; or the repellence system comprises several deterrence devices provided as fixed deterrence devices arranged in connection with the railway track or adjacent to the railway track along a length of the railway track.

9. The repellence system according to claim 8, wherein:

the train is provided with a navigation device configured to provide train location data of the train, the navigation device being arranged in data transfer connection with the repellence sub-system, and the repellence sub-system is configured to receive the location data from the navigation device;

the repellence sub-system is configured to store device location data of the one or more fixed deterrence devices;

the one or more fixed deterrence devices are arranged in data transfer connection with the repellence sub-system and configured to receive the species-specific deterrence instructions from the repellence sub-system; and the repellence sub-system is configured to select one or more fixed deterrence devices based on the device location data of the one or more fixed deterrence devices and the train location data of the navigation device and to initiate the species-specific deterrence actions in the selected one or more deterrence devices.

10. The repellence system according to claim 8, wherein:

the one or more fixed deterrence devices are directed towards the railway track such that the deterrence actions are directed towards the railway track; or the deterrence sound device or deterrence ultrasound device is directed towards the railway track such that the deterrence actions are directed towards the railway track; or the deterrence light device is directed towards the railway track such that the deterrence actions are directed towards the railway track; or the deterrence sound device or deterrence ultrasound device and the deterrence light device are directed towards the railway track such that the deterrence actions are directed towards the railway track.

11. The repellence system according to claim 1, wherein the repellence sub-system is configured to:

determine a distance between the imaging device and the detected animal and initiate the species-specific deterrence actions with the one or more deterrence devices based on the determined distance; or determine a distance between the train or cockpit of the train and the detected animal and initiate the species-specific deterrence actions with the one or more deterrence devices based on the determined distance; or store a predetermined deterrence distance threshold value;

determine a distance between the imaging device and the detected animal; and initiate the species-specific deterrence actions with the one or more deterrence devices when the determined distance is equal to or less than the predetermined deterrence distance threshold value; or store a predetermined deterrence distance threshold value;

determine a distance between the train or the cockpit of the train and the detected animal; and initiate the species-specific deterrence actions with the one or more deterrence devices when the determined distance is equal to or less than the predetermined deterrence distance threshold value.

12. The repellence system according to claim 11, wherein the repellence sub-system is configured to:

determine a moving direction of the detected animal based on the image data from the imaging device;

initiate the species-specific deterrence actions with the one or more deterrence devices based on the determined moving direction of the detected animal; or store a predetermined deterrence distance threshold value;

determine a moving direction of the detected animal based on the image data from the imaging device;

determine a distance between the train or cockpit of the train and the detected animal; and initiate the species-specific deterrence actions with the one or more deterrence devices based on the determined moving direction of the detected animal when the determined distance is equal to or less than the predetermined deterrence distance threshold value.

13. A method for repelling animals from a railway track, the method being performed by a repellence system comprising an imaging device mounted to a train and directed in a forward direction of the train along the railway track, one or more deterrence devices, and a repellence sub-system having one or more processors and memory storing instructions for execution by the one or more processors, the method comprising:

generating image data from the railway track with the imaging device during movement of the train along the railway track;

detecting an animal in the image data with the repellence sub-system;

identifying an animal species of the detected animal in the image data with the repellence sub-system;

defining species-specific deterrence instructions based on the identified animal species with the repellence sub-system; and carrying out species-specific deterrence actions based on the defined species-specific deterrence instructions with the one or more deterrence devices by directing the deterrence actions towards the detected animal and towards the railway track for repelling the detected animal from the railway track;

wherein:

the imaging device is mounted to a cockpit of the train and directed in the forward moving direction of the train;

the one or more deterrence devices comprise a deterrence sound device mounted to the cockpit of the train and directed towards the railway track and in the forward direction of the train;

the deterrence sound device is configured to generate species-specific deterrence sound actions as the deterrence actions in response to the species-specific deterrence instructions such that the deterrence actions are directed towards the railway track in the forward direction of the train; and the method comprises determining a moving direction of the detected animal based on the image data from the imaging device, and initiating the species-specific deterrence actions with the one or more deterrence devices based on the moving direction of the detected animal.

14. The method for repelling animals from a railway track, the method being performed by a repellence system, the repellence system comprising an imaging device mounted to a train and directed in a forward direction of the train along the railway track, one or more deterrence devices, and a repellence sub-system having one or more processors and memory storing instructions for execution by the one or more processors, the method comprising:

generating image data from the railway track with the imaging device during movement of the train along the railway track;

detecting an animal in the image data with the repellence sub-system;

identifying an animal species of the detected animal in the image data with the repellence sub-system;

defining species-specific deterrence instructions based on the identified animal species with the repellence sub-system; and carrying out species-specific deterrence actions based on the defined species-specific deterrence instructions with the one or more deterrence devices by directing the deterrence actions towards the detected animal and towards the railway track for repelling the detected animal from the railway track;

wherein:

the imaging device is mounted to a cockpit of the train and directed in the forward moving direction of the train;

the one or more deterrence devices comprise a deterrence sound device mounted to the cockpit of the train and directed towards the railway track and in the forward direction of the train;

the deterrence sound device is configured to generate species-specific deterrence sound actions as the deterrence actions in response to the species-specific deterrence instructions such that the deterrence actions are directed towards the railway track in the forward direction of the train;

the method comprises determining a moving direction of the detected animal based on the image data from the imaging device, and initiating the species-specific deterrence actions with the one or more deterrence devices based on the moving direction of the detected animal; and the method is carried out with a repellence system according to claim 1.

* * * * *